(12) United States Patent
Venkatesh et al.

(10) Patent No.: US 8,934,577 B1
(45) Date of Patent: Jan. 13, 2015

(54) BIAS CURRENT CONTROL FOR A RADIO FREQUENCY UNIT OF A WIRELESS NETWORK INTERFACE

(71) Applicant: Marvell International Ltd., Hamilton (BM)

(72) Inventors: Swaroop Venkatesh, Dublin, CA (US); Atul Salhotra, Santa Clara, CA (US); Sergey Timofeev, Santa Clara, CA (US); Rohit U. Nabar, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 55 days.

(21) Appl. No.: 13/681,192

(22) Filed: Nov. 19, 2012

Related U.S. Application Data

(60) Provisional application No. 61/562,318, filed on Nov. 21, 2011.

(51) Int. Cl.
*H04L 25/06* (2006.01)
*H04L 27/38* (2006.01)

(52) U.S. Cl.
CPC ............ *H04L 25/06* (2013.01); *H04L 27/3809* (2013.01)
USPC ........................................ 375/319

(58) Field of Classification Search
USPC ......................................... 375/317, 318, 319
See application file for complete search history.

(56) References Cited

U.S. PATENT DOCUMENTS

| | | | |
|---|---|---|---|
| 6,480,700 B1 * | 11/2002 | Groe et al. ........................ | 455/69 |
| 2010/0239049 A1 * | 9/2010 | Horisaki ........................ | 375/316 |
| 2011/0116399 A1 * | 5/2011 | Cho et al. ........................ | 370/252 |

OTHER PUBLICATIONS

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Opreation in Bands below 6 GHz," *The Institute of Electrical and Electronics Engineers, Inc.*, Mar. 2012.

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) And Physical Layer (PHY) specifications, Amendment 2: Higher-speed Physical Layer (PHY) extension in the 2.4 GHz band—Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, "*The Institute of Electrical and Electronics Engineers, Inc.*, Apr. 2003.

(Continued)

*Primary Examiner* — Kevin Kim

(57) ABSTRACT

A bias current utilized in a unit of a radio frequency (RF) receiver device of a network interface is controlled. A modulation scheme utilized in a packet being received by the network interface is determined. It is determined, based on the determined modulation scheme, whether a level of the bias current should be changed. When it is determined that the level of the bias current should be changed, a control signal to change the level of the bias current is generated.

24 Claims, 13 Drawing Sheets

(56) References Cited

OTHER PUBLICATIONS

Gunnam, et al., "Multi-Rate Layered Decoder Architecture for Block LDPC Codes of the IEEE 802.11n Wireless Standard," *IEEE International Symposium on Circuits and Systems*, 2007 (ISCAS 2007), pp. 1645-1648 (2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, (1999).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007)

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

\* cited by examiner

US 8,934,577 B1

BIAS CURRENT CONTROL FOR A RADIO FREQUENCY UNIT OF A WIRELESS NETWORK INTERFACE

CROSS-REFERENCES TO RELATED APPLICATIONS

This disclosure claims the benefit of U.S. Provisional Patent Application No. 61/562,318, filed on Nov. 21, 2011, the disclosure of which is incorporated herein by reference.

FIELD OF THE DISCLOSURE

The present disclosure relates generally to communication networks and, more particularly, to devices in a wireless local area network that utilize a set of different modulation and coding techniques when communicating with one another.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

SUMMARY

In one embodiment, a method is for controlling a bias current utilized in a unit of a radio frequency (RF) receiver device of a network interface. The method includes determining, with the network interface, a modulation scheme utilized in a packet being received by the network interface, and determining, with the network interface and based on the determined modulation scheme, whether a level of the bias current should be changed. The method also includes, when it is determined that the level of the bias current should be changed, generating, with the network interface, a control signal to change the level of the bias current.

In another embodiment, an apparatus for receiving a packet via a wireless communication channel comprises a network interface. The network interface includes a radio frequency (RF) receiver device having (i) a signal processing unit that utilizes a bias current, and (ii) a bias current control device configured to control a level of the bias current. The network interface is configured to determine a modulation scheme utilized in a packet being received by the network interface, and determine, based on the determined modulation scheme, whether a level of the bias current should be changed. The bias current control device is configured to, when it is determined that the level of the bias current should be changed, generate a control signal to change the level of the bias current.

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol, referred to herein as a legacy communication protocol. The legacy communication protocol (e.g., the IEEE 802.11a Standard, the IEEE 802.11b Standard, and/or the IEEE 802.11g Standard) specifies modulation schemes that are less complex and data rates that are slower than other communication protocols discussed below.

In some embodiments, the AP is also configured to communicate with client stations according to one or more other communication protocols which specify modulation schemes, coding schemes, etc., that provide data rates higher than supported by the legacy communication protocol. For example, in an embodiment, the AP is configured to operate according to a second communication protocol such as the IEEE 802.11n Standard. The communication protocol specified by the IEEE 802.11n Standard is sometimes referred to as a high throughput (HT) communication protocol. As another example, in an embodiment, the AP is configured to operate according to a third communication protocol such as the IEEE 802.11 ac Standard. The communication protocol specified by the IEEE 802.11 ac Standard is sometimes referred to as a very high throughput (VHT) communication protocol. For example, the VHT communication protocol specifies modulation and coding schemes that are more complex and provide higher data rates than the HT communication protocol. For example, the VHT communication protocol specifies a modulation and coding scheme (MCS) that utilizes 256 quadrature amplitude modulation (QAM), whereas the HT communication protocol is capable of supporting a maximum of 64 QAM. On the other hand, both the VHT communication protocol and the HT communication protocol specifies modulation and coding schemes that are more complex and provide higher data rates than the legacy communication protocol.

Figure 1:
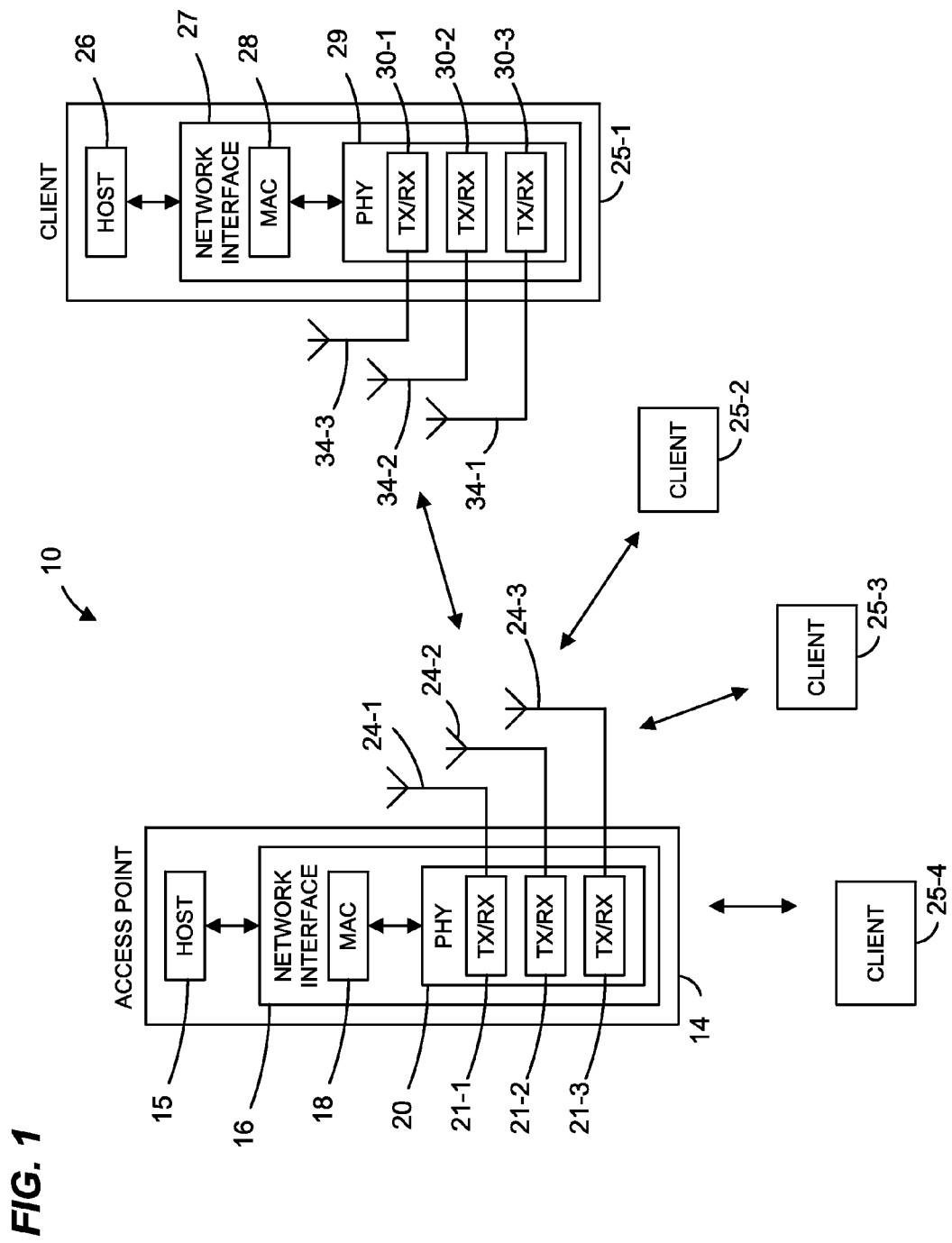
FIG. 1 is a block diagram of an example wireless local area network (WLAN) in which devices are capable of utilizing different modulation and coding techniques, according to an embodiment.

FIG. 1 is a block diagram of an example WLAN 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the HT communication protocol. In some embodiments, at least one of the client stations 25 (e.g., client station 25-4) is configured to operate at least according to the VHT communication protocol.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In some embodiments, one, some, or all of the client stations 25-2, 25-3, and 25-4 has/have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the PHY processing unit 20 of the AP 14 is configured to generate data units conforming to one or both of the HT and VHT communication protocols. The transceiver(s) 21 is/are configured to transmit the generated data units via the antenna(s) 24. Similarly, the transceiver(s) 21 is/are configured to receive data units via the antenna(s) 24. The PHY processing unit 20 of the AP 14 is also configured to process received data units conforming to the legacy communication protocol and one or both of the HT and VHT communication protocols, according to various embodiments.

In various embodiments, the PHY processing unit 29 of the client device 25-1 is configured to generate data units conforming to at least one of the HT and VHT communication protocols. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is also configured to process received data units conforming to the legacy communication protocol and one or both of the HT and VHT communication protocols, according to various embodiments.

Figure 2:
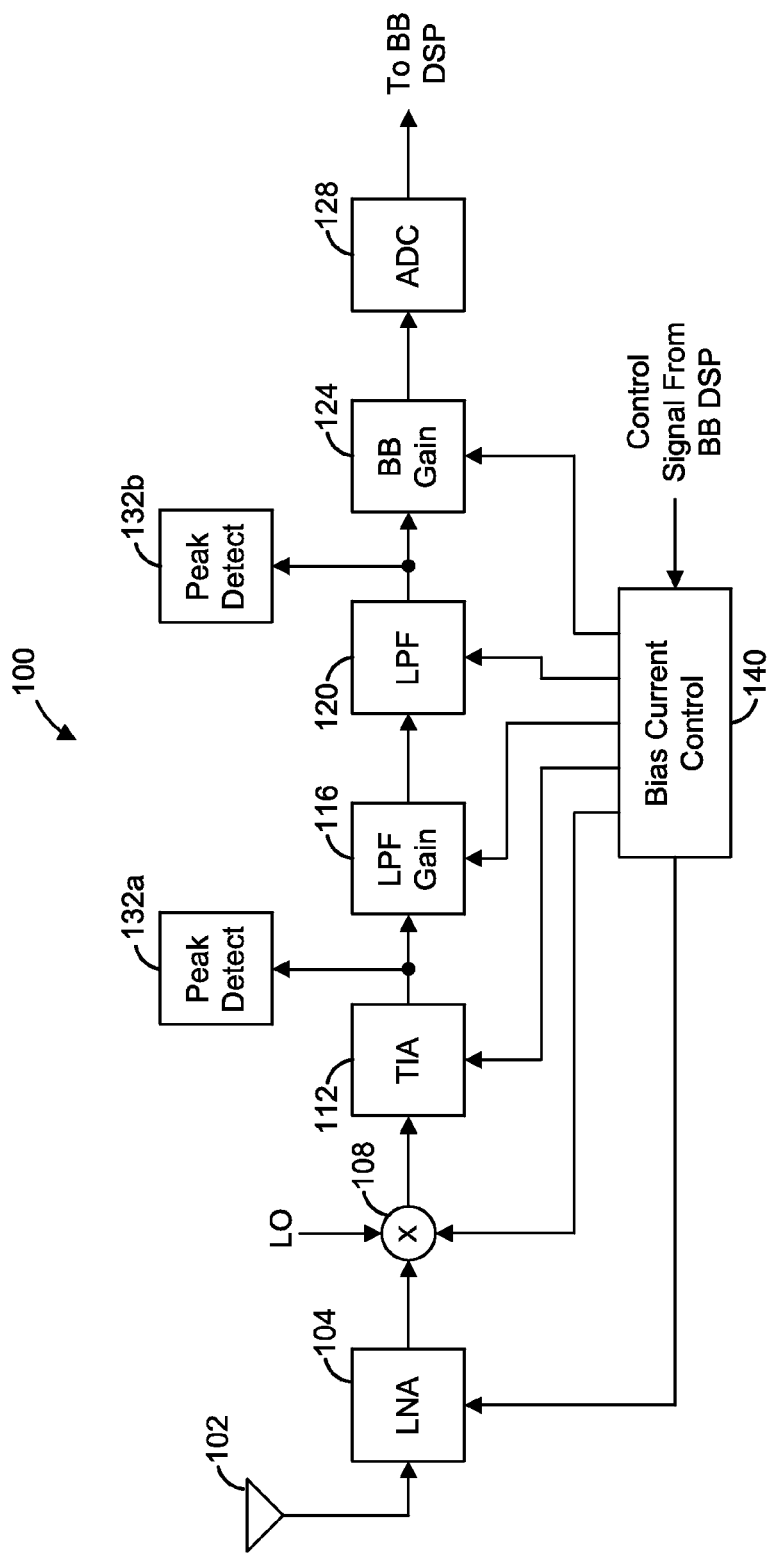
FIG. 2 is a block diagram of an example radio frequency (RF) receiver device of a network interface in FIG. 1, according to an embodiment.

FIG. 2 is a block diagram of a radio frequency (RF) receiver device 100 of an example network interface, according to an embodiment. The RF receiver device 100 is included in the transceiver unit 21-1 of the PHY processing unit 20, in an embodiment. For example, each transceiver unit 21 includes a corresponding RF receiver device 100, according to an embodiment. The RF receiver device 100 is included in the transceiver unit 30-1 of the PHY processing unit 29, in an embodiment. For example, each transceiver unit 30 includes a corresponding RF receiver device 100, according to an embodiment.

The RF receiver device 100 utilizes configurable bias current(s) for one or more analog units of the RF receiver device 100, according to an embodiment. The RF receiver device 100 is coupled to an RF antenna 102 for receiving an RF signal. The antenna 102 is coupled to an input of a variable gain low noise amplifier (LNA) 104, and an output of the LNA 104 is coupled to an input of a mixer 108 that mixes the RF signal with a local oscillator signal (LO) to generate a mixed signal. An output of the mixer 108 is coupled to an input of a transimpedance amplifier (TIA) 112 that processes the mixed signal. An output of the TIA 112 is coupled to an input of a variable gain stage 116 that amplifies the mixed signal prior to a low pass filter (LPF) 120. An output of the variable gain stage 116 is coupled to an input of the LPF 120. The LPF 120 filters the mixed signal to generate an analog baseband signal.

An output of the LPF 120 is coupled to an input of a variable gain stage 124 that amplifies the analog baseband signal prior to an analog-to-digital converter (ADC) 128. An output of the variable gain stage 124 is coupled to an input of the ADC 128. The ADC 128 converts the analog baseband signal to a digital baseband signal. An output of the ADC 128 is coupled to an input a digital signal processor (DSP) (not shown) that is configured to demodulate and decode the digital baseband signal.

In various embodiments, one or more of the LNA 104, the mixer 108, the TIA 112, the variable gain stage 116, the LPF 120, and the variable gain stage 124 includes a respective bias current generator circuit (not shown) that is configured to generating a respective bias current at different levels.

In some embodiments, the RF receiver device 100 includes one or more peak detection devices 132. In an embodiment, each peak detection device 132 is configured to detect whether an analog signal exceeds a threshold and to generate a peak detect signal that indicates when the analog signal exceeds a threshold. The peak detect signal(s) are utilized for various suitable functions in the network interface, such as in the DSP and/or in the RF receiver device 100.

As an example, the peak detection device 132a is configured to detect whether the mixed signal exceeds a first threshold and to generate a first peak detect signal that indicates when the mixed signal exceeds the first threshold, in an embodiment. As another example, the peak detection device 132b is configured to detect whether the analog baseband signal exceeds a second threshold and to generate a second peak detect signal that indicates when the analog baseband signal exceeds the second threshold, in an embodiment. In other embodiments, the peak detection devices 132 monitor signals at different stages within the RF receiver device 100 than illustrated in FIG. 2. For example, in one embodiment, the peak detection device 132a is configured to monitor the output of the mixer 108. As another example, the peak detection device 132b is configured to monitor the output of the variable gain stage 116. In some embodiments, more than two peak detection devices 132 are utilized. In some embodiments, peak detection devices 132 are omitted.

The RF receiver device 100 also includes a bias current control device 140. The bias current control device 140 generates one or more control signals that control the amount of bias current utilized in each of one or more units in the RF receiver device 100. For example, in an embodiment, the bias current control device 140 generates one or more control signals that control the amount of bias current utilized in one or more of the LNA 104, the mixer 108, the TIA 112, the variable gain stage 116, the LPF 120, and the variable gain stage 124. In an embodiment, the bias current control device 140 generates at least two control signals that control the amount of bias current utilized in two or more of the LNA 104, the mixer 108, the TIA 112, the variable gain stage 116, the LPF 120, and the variable gain stage 124. In an embodiment, the bias current control device 140 generates at least three control signals that control the amount of bias current utilized in three or more of the LNA 104, the mixer 108, the TIA 112, the variable gain stage 116, the LPF 120, and the variable gain stage 124. In one embodiment, the bias current control device 140 generates four control signals that control the amount of bias current utilized in the LNA 104, the TIA 112, the variable gain stage 116, and the variable gain stage 124.

In an embodiment, the bias current control device 140 is configured to control bias current(s) in unit(s) of the RF receiver device 100 based on a detected modulation technique and/or a number of spatial streams being utilized in a packet being received by the RF receiver device 100. For example, in an embodiment, the DSP (not shown) determines a modulation technique and/or a number of spatial streams being utilized in a packet being received, and then generates a control signal that indicates the modulation technique and/or the number of spatial streams, which control signal is then provided to the bias current control device 140. In an embodiment, the bias current control device 140 controls bias current(s) in unit(s) of the RF receiver device 100 based on the modulation technique and/or the number of spatial streams indicated by the control signal from the DSP. In some embodiments, the DSP (not shown) determines a protocol (e.g., legacy or HT or VHT) according to which the packet being received was transmitted, and then generates a control signal that indicates the protocol, which control signal is then provided to the bias current control device 140. In an embodiment, the bias current control device 140 controls bias current(s) in unit(s) of the RF receiver device 100 also based on the protocol indicated by the control signal from the DSP.

In some embodiments, the bias current control device 140 is configured to control bias current(s) in unit(s) of the RF receiver device 100 so that the relatively low bias current(s) is/are used for relatively lower (or less complex) modulation schemes and/or relatively higher numbers of spatial streams, and so that the relatively high bias current(s) is/are used for relatively higher modulation schemes and/or relatively lower numbers of spatial streams. For example, the IEEE 802.11ac Standard (now being finalized) defines an orthogonal frequency division multiplexing (OFDM) modulation and coding scheme that utilizes 256-QAM modulation. In some embodiments, adequate reception and processing (e.g., demodulation and decoding) of a signal utilizing such a modulation scheme (e.g., 256-QAM) requires higher bias current(s) in one or more unit(s) of the RF receiver device 100 as compared to adequate reception and processing of another signal that utilizes a less complex modulation scheme (e.g., 64-QAM modulation). Thus, in some embodiments, the bias current control device 140 is configured to control bias current(s) in unit(s) of the RF receiver device 100 so that the relatively low bias current(s) is/are used for an OFDM signal utilizing 64-QAM, and so that the relatively high bias current(s) is/are used for an OFDM signal utilizing 256-QAM.

As another example, in some embodiments, adequate reception and processing (e.g., demodulation and decoding) of a signal utilizing a first number of spatial streams requires higher bias current(s) in one or more unit(s) of the RF receiver device 100 as compared to adequate reception and processing of another signal that utilizes a second number of spatial streams that is less than the first number of spatial streams. Thus, in some embodiments, the bias current control device 140 is configured to control bias current(s) in unit(s) of the RF receiver device 100 so that the relatively low bias current(s) is/are used for an OFDM signal utilizing a number of spatial streams less than a number of receive antennas, and so that the relatively high bias current(s) is/are used for an OFDM signal utilizing a number of spatial streams equal to the number of receive antennas.

In some embodiments, the bias current control device 140 is configured to control bias current(s) in unit(s) of the RF receiver device 100 so that a relatively low bias current(s) is/are used in between packet transmissions and so that a relatively high bias current(s) is/are used after packet has been detected. For example, in some embodiments, the bias current control device 140 is configured to control bias current(s) in unit(s) of the RF receiver device 100 so that bias current(s) adequate for the network interface to detect a packet is/are used in between packet transmissions and so that higher bias current(s) adequate for reception and processing (e.g., demodulation and decoding) of a signal is/are used after packet has been detected.

In an embodiment, each of one or more control signals generated by the current control device 140 respectively control a respective bias current generator circuit of a respective one of the LNA 104, the mixer 108, the TIA 112, the variable gain stage 116, the LPF 120, and/or the variable gain stage 124, to cause the bias current generator circuit to generate a bias current at a desired level.

Figure 3:
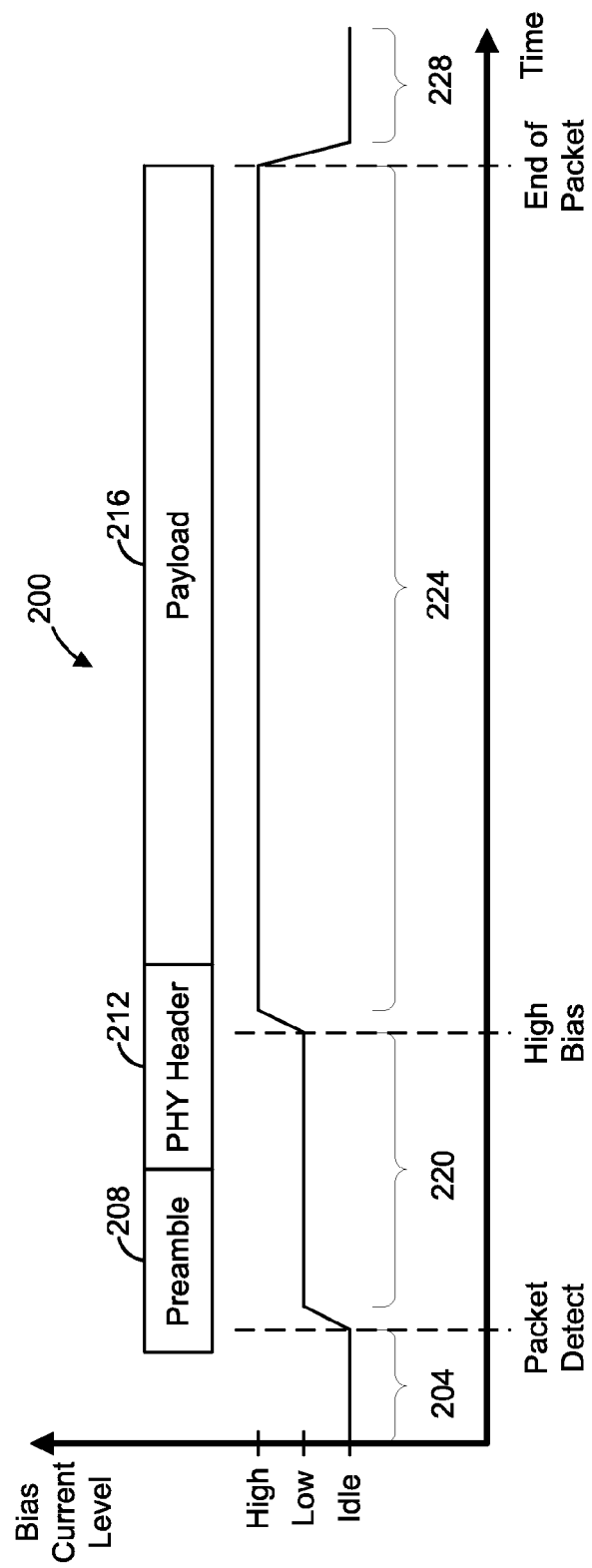
FIG. 3 is a diagram illustrating an example scenario in which a bias current of a unit of the RF receiver device of FIG. 2 is controlled when a packet is being received, according to an embodiment.

FIG. 3 is a diagram illustrating an example scenario in which a bias current is controlled by the bias current control device 140, in a manner such as described above, when a packet 200 is being received by the network interface, according to an embodiment.

During a time period 204 that generally corresponds to a time prior to the packet 200 being detected by the network interface (e.g., including a time period between an end of a previous packet (not shown) and the beginning of the packet 200), the bias current control device 140 causes a first bias current level to be utilized. The first bias current level is adequate for the network interface to provide a required suitable performance level for packet detection. After receiving at least a portion of a preamble 208 of the packet 200, the network interface (e.g., the DSP or another suitable device in the network interface) detects the packet 200 using a suitable packet detection technique (e.g., including clear channel assessment (CCA) techniques, energy detection techniques, preamble detection techniques, etc.). After the packet 200 is detected by the network interface, the bias current control device 140 causes a second bias current level to be utilized. The second bias current level is adequate for the network interface to provide a required suitable performance level for decoding a packet (i) modulated using a modulation technique in a first set of one or more modulation techniques, and/or (ii) transmitted when using a number of spatial streams from a first set of one or more numbers when transmitting at least the PHY payload 216. For example, in an embodiment, at least a portion of a PHY header 212 of the packet 200 is modulated according to a modulation scheme specified in the legacy protocol, and the second bias current level is adequate for the network interface to provide a required suitable performance level for decoding the least the portion of the PHY header 212.

After receiving at least a portion of a physical layer (PHY) header 212 of the packet 200, the network interface (e.g., the DSP or another suitable device in the network interface) decodes fields of the PHY header 212 that indicate one or both of (i) a modulation technique utilized to transmit at least a PHY payload 216 of the packet 200 and (ii) a number of spatial streams utilized when transmitting at least the PHY payload 216. When the network interface determines that the modulation technique indicated in the PHY header 212 is in a second set of one or more modulation schemes and/or the number of spatial streams indicated in the PHY header 212 is in a second set of one or more numbers, the bias current control device 140 causes a third bias current level to be utilized. The third bias current level is adequate for the network interface to provide a required suitable performance level for decoding the PHY payload 216 when (i) modulated using a modulation scheme in the second set of one or modulation schemes and/or (ii) transmitted when the number of spatial streams utilized is in the second set of one or more numbers.

The second bias current level is utilized during a second time period 220 between (i) when the packet 200 is detected by the network interface and (ii) when (a) the modulation scheme utilized and/or (b) the number of spatial streams utilized is determined. When the network interface determines that the modulation technique indicated in the PHY header 212 is in the second set of one or more modulation schemes and/or the number of spatial streams indicated in the PHY header 212 is in the set of one or more numbers, the bias current control device 140 causes the third bias current level to be utilized during a third time period 224. The third time period 224 is between (i) an end of the second period and (ii) an end of the packet 200.

After receiving the end of the packet 200, the bias current control device 140 causes the first bias current level to be utilized. For example, during a time period 228 that generally corresponds to the end of the packet 200 and a time at which a subsequent packet is detected by the network, the bias current control device 140 causes the first bias current level to be utilized.

In an embodiment, the second bias current level is higher than the first bias current level, and the third bias current level is higher than the second bias current level. Thus, during the periods 204 and 228, when the first bias current level is utilized, less power is consumed by the RF receiver device 100 as compared to the period 220 when the second bias current level is utilized and the period 224 when the third bias current level is utilized. Similarly, during the period 220 when the second bias current level is utilized less power is consumed by the RF receiver device 100 as compared to the period 224 when the third bias current level is utilized.

In an embodiment, the first bias current level is not adequate for the network interface to provide a required suitable performance level for decoding neither the PHY header 212 nor the PHY payload 216. In an embodiment, the second bias current level is not adequate for the network interface to provide a required suitable performance level for decoding the PHY payload 216 when (i) modulated using a modulation scheme in the second set of one or more modulation schemes and/or (ii) transmitted when the number of spatial streams utilized is in the second set of one or more numbers.

Figure 4:
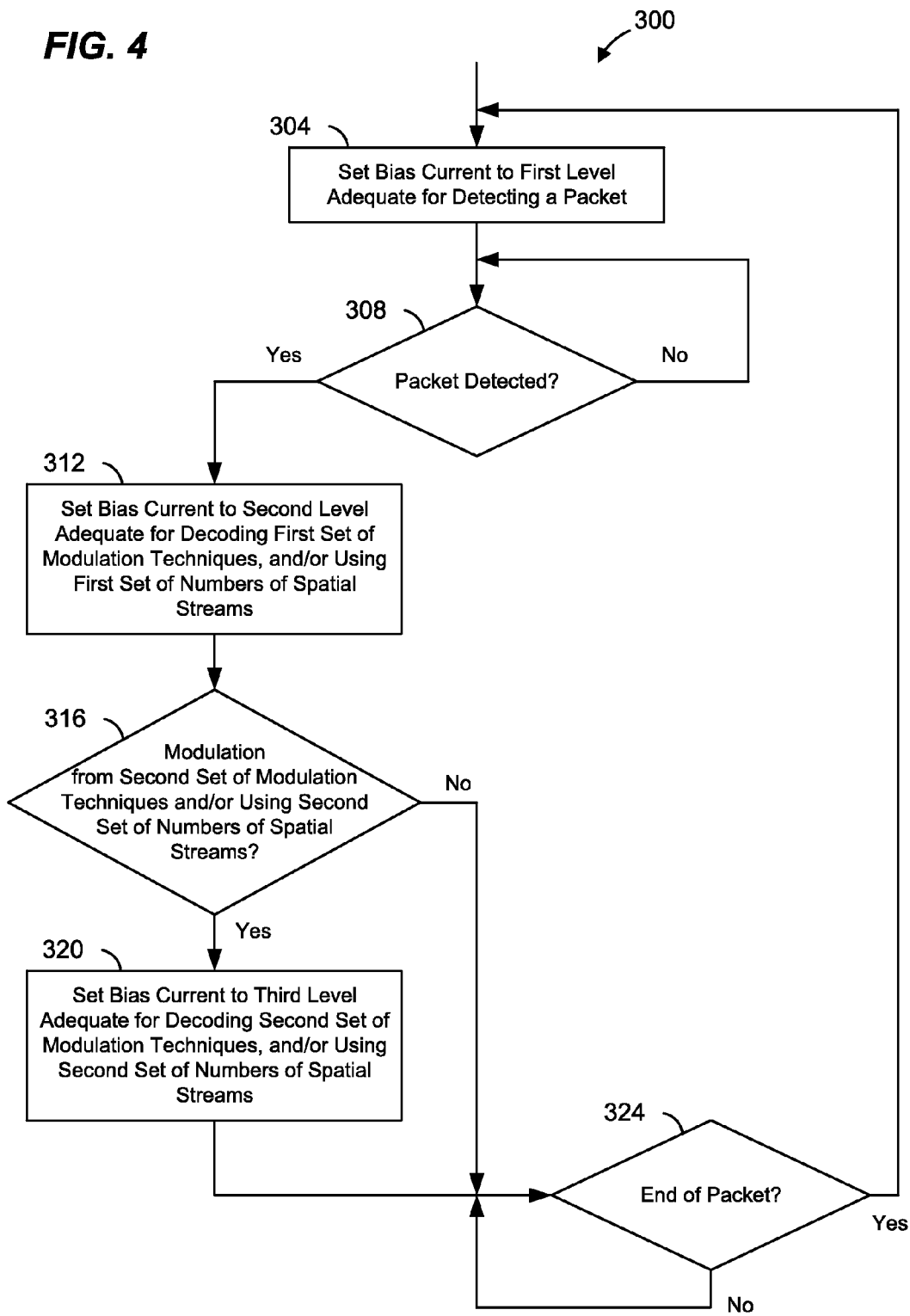
FIG. 4 is a flow diagram of an example method for controlling a bias current in a unit of an RF receiver device, such as the RF receiver device of FIG. 2, according to an embodiment.

FIG. 4 is a flow diagram of an example method 300 for controlling a bias current in a unit of an RF receiver device (e.g., the RF receiver device 100), according to an embodiment. The method 300 is implemented by the bias current control device 140, in an embodiment. In other embodiments, the bias current control device 140 implements another suitable method for controlling a bias current in a unit of the RF receiver device 100.

The method 300 begins at block 304 during a time prior to receiving a start of a packet. At block 304, a bias current is set to the first bias current level discussed above. The bias current control device 140 causes the first bias current level to be utilized by sending a control signal to the unit in the RF receiver 100 that utilizes the bias current, in an embodiment.

At block 308, it is determined whether a packet is detected. As discussed above, the DSP or another suitable device in the network interface determines when a packet is detected using a suitable packet detection technique. In an embodiment, the bias current control device 140 receives an indicator signal that indicates that the network interface detected a packet. When it is determined that a packet has been detected, the flow proceeds to block 312.

At block 312, the bias current is set to the second bias current level discussed above. For example, the second bias current level is adequate for the network interface to provide a required suitable performance level for decoding a packet (i) modulated using a modulation technique in the first set of one or more modulation techniques, and/or (ii) transmitted when using a number of spatial streams from the first set of one or more numbers when transmitting at least a PHY payload of the packet, in an embodiment. For example, in an embodiment, at least a portion of a PHY header 212 of the packet 200 is modulated according to a modulation scheme specified in the legacy protocol, and the second bias current level is adequate for the network interface to provide a required suitable performance level for decoding the least the portion of the PHY header 212. The bias current control device 140 causes the second bias current level to be utilized by sending a control signal to the unit in the RF receiver 100 that utilizes the bias current, in an embodiment.

At block 316, after receiving at least a portion of the PHY header of the packet, it is determined whether the modulation technique utilized to modulate a PHY payload of the packet is in a second set of one or more modulation schemes and/or the number of spatial streams indicated in the PHY header 212 is in a second set of one or more numbers. For example, the network interface (e.g., the DSP or another suitable device in the network interface) is configured to decode fields of the PHY header that indicate one or both of (i) a modulation technique utilized to transmit at least the PHY payload of the packet and (ii) a number of spatial streams utilized when transmitting at least the PHY payload. In an embodiment, the bias current control device 140 receives an indicator signal that indicates that the network interface determined that the modulation technique utilized to modulate a PHY payload of the packet is in the second set of one or more modulation schemes and/or the number of spatial streams indicated in the PHY header 212 is in the second set of one or more numbers.

When it is determined at block 316 that the modulation technique utilized to modulate the PHY payload of the packet is in the second set of one or more modulation schemes and/or the number of spatial streams indicated in the PHY header is in the second set of one or more numbers, the flow proceeds to block 320.

At block 320, the bias current is set to the third bias current level discussed above. For example, the third bias current level is adequate for the network interface to provide a required suitable performance level for decoding a packet (i) modulated using a modulation technique in the second set of one or more modulation techniques, and/or (ii) transmitted when using a number of spatial streams from the second set of one or more numbers when transmitting at least a PHY payload of the packet, in an embodiment. The bias current control device 140 causes the third bias current level to be utilized by sending a control signal to the unit in the RF receiver 100 that utilizes the bias current, in an embodiment.

At block 324, it is determined whether the packet is ended. The DSP or another suitable device in the network interface determines when the packet is ended using a suitable technique. In an embodiment, the bias current control device 140 receives an indicator signal that indicates that the network interface determined that the packet is ended. When it is determined that a packet has ended, the flow returns to block 304.

In another embodiment, block 316 omits determining the number of spatial streams indicated in the PHY header. In another embodiment, block 316 omits determining the modulation technique utilized to modulate the PHY payload. In another embodiment, the flow proceeds from block 316 to block 320 only when it is determined that both (i) the modulation technique utilized to modulate the PHY payload of the packet is in the second set of one or more modulation schemes and (ii) the number of spatial streams indicated in the PHY header is in the second set of one or more numbers.

In other embodiments, the flow 300 is modified to accommodate multiple different third bias current levels corresponding to different sets of modulation schemes and/or to different spatial streams. In other embodiments, the multiple different third bias current levels are additionally selected based on different signal quality levels (e.g., SNR, RSSI, etc.).

Figure 5:
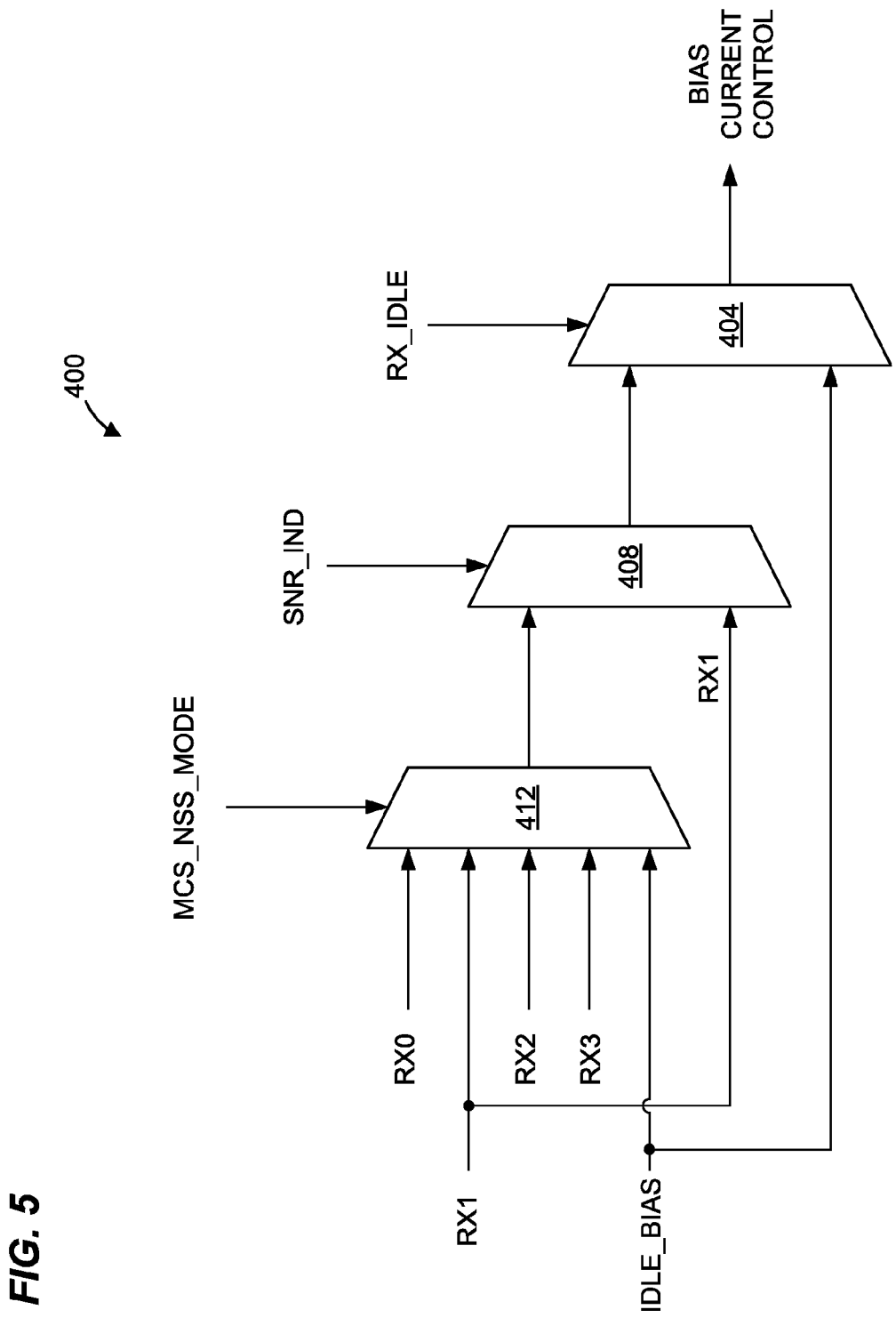
FIG. 5 is a block diagram of an example logic device for generating a control signal for controlling a bias current level, according to an embodiment.

FIG. 5 is a block diagram of example logic device 400 for generating a control signal for controlling a bias current level, according to an embodiment. In an embodiment, the logic device 400 is included in the bias current control device 140 of FIG. 2. In other embodiments, the bias current control device 140 includes another suitable logic device different than the logic device 400.

The logic device 400 includes a multiplexer 404, a multiplexer 408, and a multiplexer 412. The multiplexer 404 includes a first data input, a second data input, a control input, and an output. The output of the multiplexer 404 is a bias current control signal that indicates which bias current level in a set of different bias current levels a unit in the RF receiver device 100 (e.g., the LNA 104, the mixer 108, the TIA 112, the variable gain stage 116, the LPF 120, the variable gain stage 124, etc.) should utilize, in an embodiment.

The first data input of the multiplexer 404 receives an output of the multiplexer 408. The second data input of the multiplexer 404 receives an IDLE_BIAS control value that corresponds to the first bias current level discussed above. For example, the first bias current level is adequate for the network interface to provide a required suitable performance level for packet detection, but the first bias current level is not adequate to provide a required suitable performance level for decoding a packet, in an embodiment. The control input of the multiplexer 404 receives an RX_IDLE control signal for selecting one of (i) the first data input of the multiplexer 404 or (ii) the second data input of the multiplexer 404 as the output of the multiplexer 404. The RX_IDLE control signal indicates whether a packet is currently being received by the network interface, in an embodiment. For example, the RX_IDLE control signal indicates whether a packet has been detected and, after a packet is detected, whether an end of the packet has been receive, in an embodiment. For example, in between reception of packets, the RX_IDLE control signal selects the first data input (i.e., IDLE_BIAS), whereas after a packet is detected and prior to the end of the packet being received, the RX_IDLE control signal selects the second data input (i.e., the output of the multiplexer 408), in an embodiment. As another example, if the network interface determines that a packet can be ignored (e.g., because the network interface determines that the packet is not addressed to the network interface), the RX_IDLE control signal is set to select the first data input (i.e., IDLE_BIAS), in an embodiment.

The multiplexer 408 includes a first data input, a second data input, a control input, and an output. The output of the multiplexer 408 is coupled to the first data input of the multiplexer 404, as discussed above. The first data input of the multiplexer 408 receives an output of the multiplexer 412. The second data input of the multiplexer 408 receives an RX1 control value that is described below.

The control input of the multiplexer 408 receives an SNR_IND control signal for selecting one of (i) the first data input of the multiplexer 408 or (ii) the second data input of the multiplexer 408 as the output of the multiplexer 408. The SNR_IND control signal indicates whether a signal-to-noise ratio (SNR) or other suitable measure of signal quality and/or strength (e.g., received signal strength indicator (RSSI)), corresponding to a packet being received, is at a certain level (e.g., meets a threshold). For example, the SNR_IND control signal indicates whether the RSSI, corresponding to a packet being received, meets a threshold, in an embodiment. For example, when the RSSI does not meet the threshold, the first data input (i.e., RX1) is selected as the output of the multiplexer 408; whereas when the RSSI meets the threshold, the second data input (i.e., the output of the multiplexer 412) is selected as the output of the multiplexer 408, in an embodiment.

The multiplexer 412 includes a first data input, a second data input, a third data input, a fourth data input, a fifth data input, a control input, and an output. The output of the multiplexer 412 is coupled to the first data input of the multiplexer 408, as discussed above.

The first data input of the multiplexer 412 receives an RX0 control value that corresponds to the second bias current level discussed above, which is adequate for the network interface to provide a required suitable performance level for decoding a packet utilizing an MCS from the first set of one or more MCSs with a suitable degree of reliability, but the second bias current level is not adequate to provide a required suitable performance level for decoding a packet utilizing an MCS from a second set of one or more MCSs with a suitable degree of reliability, in an embodiment. In an embodiment, the first set of one or more MCSs includes one or more MCSs specified in the IEEE 802.11a Standard and one or more MCSs specified in the IEEE 802.11g Standard, whereas the second set of one or more MCSs includes MCSs from the IEEE 802.11n Standard. For example, in an embodiment, the RX0 bias current level is adequate for the network interface to provide a required suitable performance level for decoding the least the portion of the PHY header 212 (FIG. 3).

The second data input of the multiplexer 412 receives the RX1 control value that corresponds to a bias current level adequate for the network interface to provide a required suitable performance level for decoding packets modulated according to an MCS from the second set of one or more MCSs, but the bias current level corresponding to RX1 is not adequate to provide a required suitable performance level for decoding packets modulated according to an MCS from a third set of one or more MCSs, in an embodiment. The second set of one or more MCSs includes one or more first MCSs specified in the IEEE 802.11n Standard, whereas the second set of one or more MCSs excludes second MCSs specified in the IEEE 802.11n Standard, in an embodiment. The third set of one or more MCSs includes the second MCSs specified in the IEEE 802.11n Standard, in an embodiment. For example, in an embodiment, the second set of one or more MCSs includes one or more MCSs utilizing 16-QAM, and excludes any MCSs utilizing 64-QAM. In an embodiment, the third set of one or more MCSs includes one or more MCSs utilizing 64-QAM.

The third data input of the multiplexer 412 receives an RX2 control value that corresponds to a bias current level adequate for the network interface to provide a required suitable performance level for decoding packets modulated according to an MCS from the third set of one or more MCSs, in an embodiment. In an embodiment, the third set of one or more MCSs includes one or more MCSs utilizing 64-QAM.

In an embodiment, the fourth data input is omitted or not used.

The fifth data input of the multiplexer 412 receives the IDLE_BIAS control signal.

In an embodiment, the RX0 bias current level is higher than the IDLE_BIAS bias current level; the RX1 bias current level is higher than the RX0 bias current level; and the RX2 bias current level is higher than the RX1 bias current level.

The control input of the multiplexer 412 receives an MCS_NSS_MODE control signal. In an embodiment, the MCS_NSS_MODE control signal is for selecting one of (i) the first data input of the multiplexer 412, (ii) the second data input of the multiplexer 412, (iii) the third data input of the multiplexer 412, or (iv) the fifth data input of the multiplexer 412, as the output of the multiplexer 412. The MCS_NSS_MODE generally indicates, when an MCS and a number of spatial streams corresponding to a packet being received has been determined, to which of multiple sets of MCSs the MCS corresponds and the number of spatial streams being utilized at least relative to the number of receive antennas being utilized, in an embodiment. In some embodiments, the MCS_NSS_MODE generally indicates that a packet is detected but that the MCS and number of spatial streams are not yet determined (e.g., select RX0). In some embodiments, the MCS_NSS_MODE generally indicates that a packet is not currently being received or that a packet can be ignored (e.g., select IDLE_BIAS).

In other embodiments, the digital logic implemented by the logic device 400 is implemented in a different manner, such as without multiplexers. In an embodiment, the digital logic implemented by the logic device 400 is implemented by a processor executing firmware instructions stored in a memory device.

Figure 6:
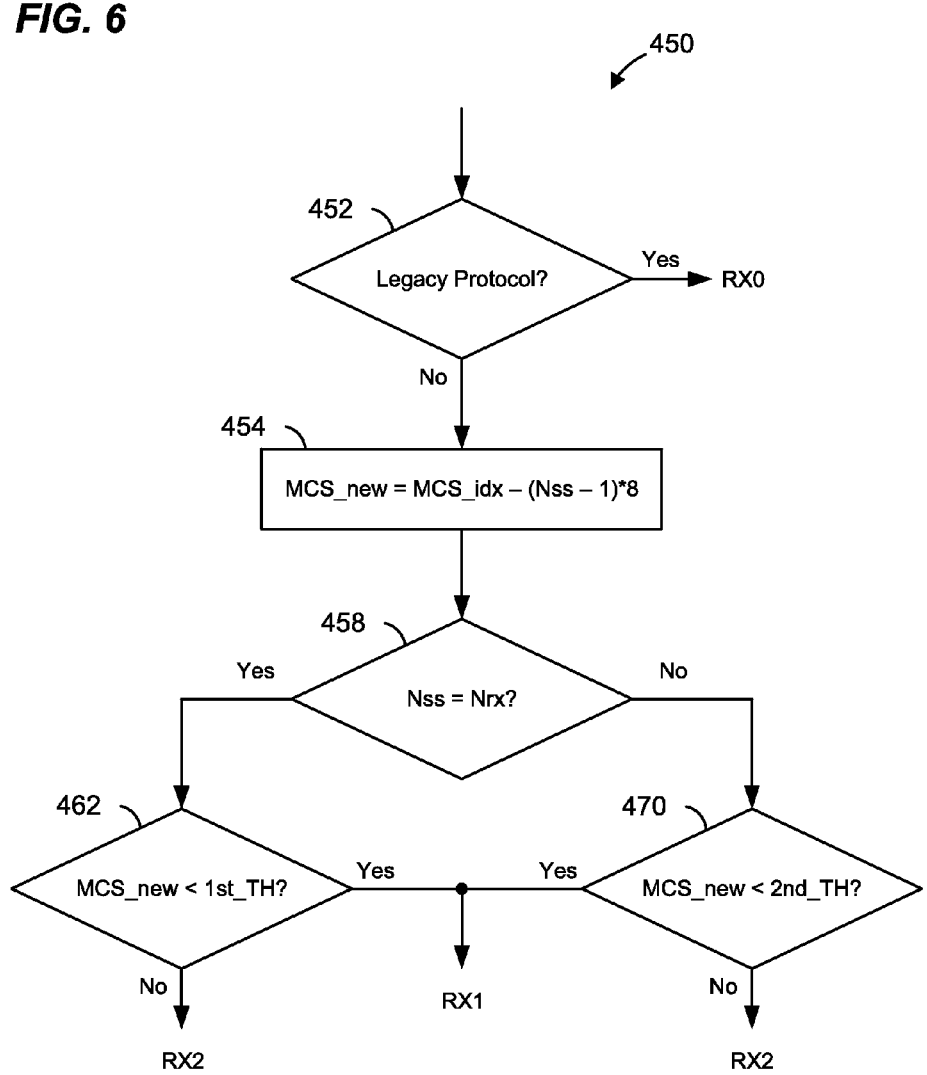
FIG. 6 is a flow diagram of an example method for generating a control signal for controlling a bias current level, according to an embodiment.

FIG. 6 is a flow diagram of an example method 450 for generating the MCS_NSS_MODE control signal for a packet being received based on (i) the MCS utilized when transmitting the packet, (ii) the number (Nss) of spatial streams utilized when transmitting the packet, and (iii) the number (Nrx) of receive antennas utilized to receive the packet, according to an embodiment. In an embodiment, the method 450 is implemented by the bias current control device 140 of FIG. 2. In another embodiment, the method 450 is implemented by the baseband DSP. In other embodiments, the method 450 is implemented by some other suitable unit of a network interface.

The method 450 assumes that a packet has been detected and that the current bias current level being utilized is RX0. On the other hand, when a packet has not been detected or it is determined that a packet should be ignored, the MCS_NSS_MODE control signal is set to a value that indicates the IDLE_BIAS level is to be utilized.

At block 452, it is determined whether the packet was transmitted according to a legacy protocol (e.g., the IEEE 802.11a Standard or the IEEE 802.11g Standard). For example, in an embodiment, when the packet is transmitted according to the legacy protocol, a relatively robust MCS is being utilized and the bias current level can be kept relatively low. Block 452 comprises determining whether the packet is not transmitted according to the legacy protocol (e.g., instead transmitted using the IEEE 802.11n Standard or the IEEE 802.11ac Standard). For example, if it determined (e.g., by the DSP) that the packet is not formatted according to a high throughput (HT) protocol (e.g., the IEEE 802.11n Standard) nor formatted according to a very high throughput (VHT) protocol (e.g., the IEEE 802.11 ac Standard), it is determined that packet was transmitted according to the legacy protocol, in an embodiment.

If it is determined at block 452 that the packet was transmitted according to the legacy protocol, the MCS_NSS_MODE control signal is set to remain at the value that indicates the RX0 bias current level is to be utilized. On the other hand, if it is determined at block 462 that MCS_new is not less than 1st_TH, the flow proceeds to block 454.

At block 454, a variable MCS_new is set based on an index MCS_idx that indicates an MCS utilized when transmitting the packet. MCS_idx corresponds to the MCS index defined by the IEEE 802.11n Standard, in an embodiment. For example, increasing values of MCS_idx generally correspond to increasingly complex MCSs and increasingly higher data rates, in an embodiment. MCS_new is set to MCS_idx−(Nss−1)*8, where Nss is the number of spatial streams utilized when transmitting the packet.

At block 458, it is determined whether Nss equals Nrx (the number of receive antennas utilized to receive the packet). If Nss equals Nrx, the flow proceeds to block 462. At block 462, it is determined whether MCS_new is less than a first threshold (1st_TH). For example, in an embodiment, when MCS_new is less than 1st_TH, this indicates a relatively robust MCS is being utilized and the bias current level can be kept relatively low.

If it is determined at block 462 that MCS_new is less than 1st_TH, the MCS_NSS_MODE control signal is set to a value that indicates the RX1 bias current level is to be utilized. On the other hand, if it is determined at block 462 that MCS_new is not less than 1st_TH, the MCS_NSS_MODE control signal is set to a value that indicates the RX2 bias current level is to be utilized.

Referring again to block 458, if it is determined that Nss does not equal Nrx (e.g., Nss is less than Nrx), the flow proceeds to block 470. At block 470, it is determined whether MCS_new is less than a second threshold (2nd_TH). For example, in an embodiment, when MCS_new is less than 2nd_TH, this indicates a relatively robust MCS is being utilized and the bias current level can be kept relatively low.

If it is determined at block 470 that MCS_new is less than 2nd_TH, the MCS_NSS_MODE control signal is set to a value that indicates the RX1 bias current level is to be utilized. On the other hand, if it is determined at block 470 that MCS_new is not less than 2nd_TH, the MCS_NSS_MODE control signal is set to a value that indicates the RX2 bias current level is to be utilized.

In one embodiment, 1st_TH is equal to 4, and 2nd_TH is equal to 5. In other embodiments, other suitable threshold values are utilized. In some embodiments, 1st_TH, and 2nd_TH are configurable parameters that can be adjusted during manufacturing, in the field, etc.

Figure 7:
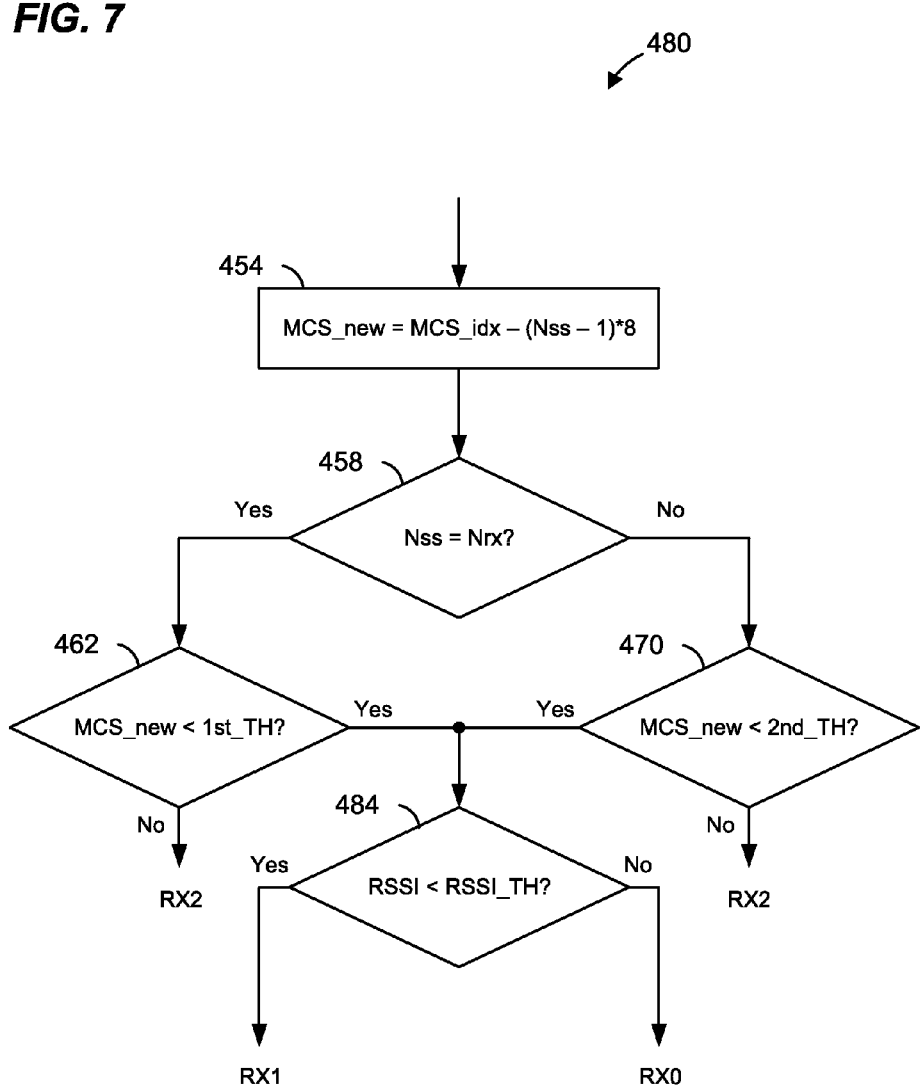
FIG. 7 is a flow diagram of another example method for generating a control signal for controlling a bias current level, according to an embodiment.

FIG. 7 is a flow diagram of another example method 480 for generating bias current level control signal for a packet being received based on (i) the MCS utilized when transmitting the packet, (ii) the number (Nss) of spatial streams utilized when transmitting the packet, and (iii) the number (Nrx) of receive antennas utilized to receive the packet, according to an embodiment. In an embodiment, the method 480 is implemented by the bias current control device 140 of FIG. 2. In another embodiment, the method 480 is implemented by the baseband DSP. In other embodiments, the method 480 is implemented by some other suitable unit of a network interface.

The method 480 is similar to the method 450 of FIG. 6, and like numbered blocks are not discussed in detail. In the method 480, it is assumed that the packet being received was transmitted according to a high throughput (HT) protocol (e.g., the IEEE 802.11n Standard) as opposed to a legacy protocol. Thus, the method begins at block 454.

At block 462, if it is determined at that MCS_new is not less than 1st_TH, then the bias current level control signal is set to RX2. On the other hand, if it is determined at block 462 that MCS_new is less than 1st_TH, the flow proceeds to block 484. At block 484, it is determined whether an RSSI measurement, corresponding to reception of the packet, meets an RSSI threshold (RSSI_TH). If the RSSI measurement does not meet RSSI_TH (e.g. RSSI<RSSI_TH), this indicates that the signal level and/or quality is relatively low, and thus the bias current level control signal is set to a value that indicates the RX1 bias current level is to be utilized. On the other hand, if the RSSI measurement meets RSSI_TH (e.g. RSSI>=RSSI_TH), this indicates that the signal level and/or quality is relatively high, and thus the bias current level control signal can remain set to a value that indicates the RX0 bias current level is to be utilized.

Similarly, at block 470, if it is determined at that MCS_new is not less than 2nd_TH, then the bias current level control signal is set to RX2. On the other hand, if it is determined at block 470 that MCS_new is less than 2nd_TH, the flow proceeds to block 484.

Figure 8:
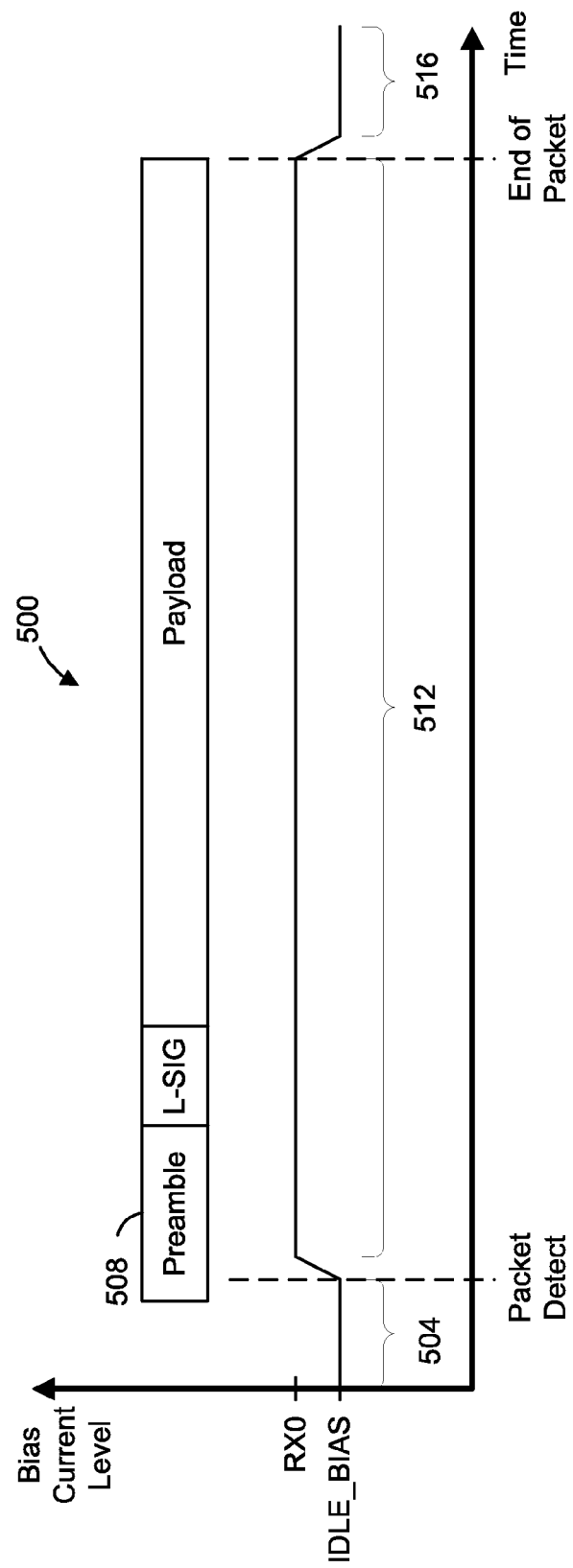
FIG. 8 is a diagram illustrating another example scenario in which a bias current of a unit of the RF receiver device of FIG. 2 is controlled when a packet is being received, according to an embodiment.

FIG. 8 is a diagram illustrating operation of the logic device 400 and the method 450 in an example scenario in which a packet 500 is received, where the packet 500 conforms to a legacy protocol (e.g., the IEEE 802.11a Standard and/or the IEEE 802.11g Standard), according to an embodiment.

During a time period 504 that generally corresponds to a time prior to the packet 500 being detected by the network interface (e.g., including a time period between an end of a previous packet (not shown) and the beginning of the packet 500), the logic device 400 selects IDLE_BIAS as the bias current control output.

After receiving at least a portion of a preamble 508 of the packet 500, the network interface (e.g., the DSP or another suitable device in the network interface) detects the packet 500 using a suitable packet detection technique (e.g., including clear channel assessment (CCA) techniques, energy detection techniques, preamble detection techniques, etc.). After the packet 500 is detected by the network interface, the logic device 400 selects RX0 as the bias current control output. Thus, during a time period 512 that generally corresponds to a time after the packet 500 is detected by the network interface and until the end of the packet 500, the logic device 400 selects the bias current control output as RX0.

After receiving the end of the packet 500, the logic device 400 selects IDLE_BIAS as the bias current control output. Thus, during a time period 516 that generally corresponds to a time after the packet 500 ends and prior to the network interface detecting a subsequent packet, the logic device 400 selects the bias current control output as IDLE_BIAS.

As can be seen in FIG. 8, the bias current changes during the preamble 508. More specifically, the bias current changes during a legacy short training field (L-STF), defined by the IEEE 802.11 Standard, of the preamble 508. The change in the bias current will often cause transients to occur in the unit of the RF receiver device 100 for which the bias current is changing. Because the bias current change occurs while the L-STF is being received, however, the RF receiver device 100 is able to suitably adjust and settle after the transients.

Figure 9:
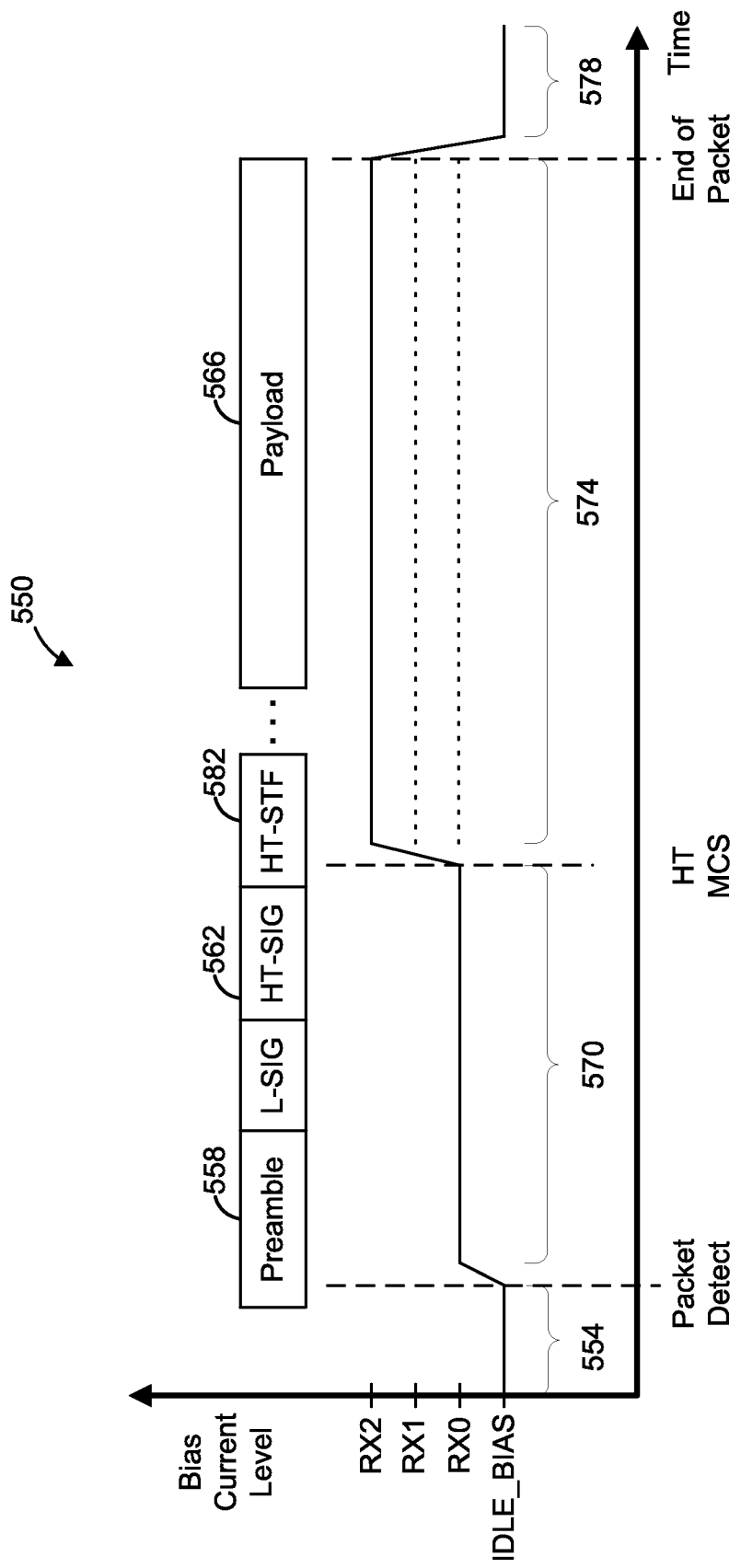
FIG. 9 is a diagram illustrating another example scenario in which a bias current of a unit of the RF receiver device of FIG. 2 is controlled when a packet is being received, according to an embodiment.

FIG. 9 is a diagram illustrating operation of the logic device 400 and the method 450, and/or the method 480, in an example scenario in which a packet 550 is received, where the packet 550 conforms to a high throughput protocol (e.g., the IEEE 802.11n Standard), according to an embodiment.

During a time period 554 that generally corresponds to a time prior to the packet 550 being detected by the network interface (e.g., including a time period between an end of a previous packet (not shown) and the beginning of the packet 550), the logic device 400 selects IDLE_BIAS as the bias current control output.

After receiving at least a portion of a preamble 558 of the packet 550, the network interface (e.g., the DSP or another suitable device in the network interface) detects the packet 550 using a suitable packet detection technique (e.g., including clear channel assessment (CCA) techniques, energy detection techniques, preamble detection techniques, etc.). After the packet 550 is detected by the network interface, the logic device 400 selects RX0 as the bias current control output.

After receiving at least a portion of a high throughput signal (HT-SIG) field 562 of the packet 550, the network interface (e.g., the DSP or another suitable device in the network interface) determines the MCS and the number of spatial streams to be utilized when transmitting a payload 566 of the packet 550. For example, the HT-SIG field 562 includes a first field that indicates the MCS (e.g., an MCS index) and a second field that indicates Nss. In an embodiment, the RX0 bias current level is adequate for the network interface to provide a required suitable performance level for decoding the HT-SIG field 562.

In some embodiments, the RSSI is also measured and compared to a threshold (e.g., RSSI_TH). After the MCS and Nss are determined, the bias current control output is set to RX1 or RX2 depending on the MCS and Nss, such as according to the method 450 or another suitable method, in an embodiment. In another embodiment, after the MCS and Nss are determined, and after the RSSI is compared to RSSI_TH, the bias current control output is set to RX0, RX1, or RX2 depending on the MCS, Nss, and RSSI, such as according to the method 480 or another suitable method, in an embodiment.

Thus, during a time period 570 that generally corresponds to a time after the packet 550 is detected by the network interface and the end of the HT-SIG field 562, the logic device 400 selects the bias current control output as RX0. On the other hand, during a time period 574 that generally corresponds to a time after the MCS and Nss is determined by the network interface and until the end of the packet 550, the logic device 400 selects the bias current control output as RX1 or RX2.

After receiving the end of the packet 550, the logic device 400 selects IDLE_BIAS as the bias current control output. Thus, during a time period 578 that generally corresponds to a time after the packet 550 ends and prior to the network interface detecting a subsequent packet, the logic device 400 selects the bias current control output as IDLE_BIAS.

As can be seen in FIG. 9, the bias current changes during the preamble 558. More specifically, the bias current changes during the L-STF of the preamble 558. The change in the bias current will often cause transients to occur in unit of the RF receiver device 100 for which the bias current is changing. Because the bias current change occurs while the L-STF is being received, however, the RF receiver device 100 is able to suitably adjust and settle after the transients. Similarly, the bias current also changes during a high throughput short training field (HT-STF) 582. The change in the bias current will often cause transients to occur in unit of the RF receiver device 100 for which the bias current is changing. Because the bias current change occurs while the HT-STF field 582 is being received, however, the RF receiver device 100 is able to suitably adjust and settle after the transients.

Referring again to FIG. 5, in an embodiment, the fourth data input of the multiplexer 412 receives an RX3 control value that corresponds to a bias current level adequate for the network interface to provide a required suitable performance level for decoding packets modulated according to an MCS from a fourth set of one or more MCSs, in an embodiment. In an embodiment, MCSs in the fourth set are excluded from the third set of MCSs discussed above. In an embodiment, the fourth set of one or more MCSs includes one or more MCSs utilizing 256-QAM.

Figure 10:
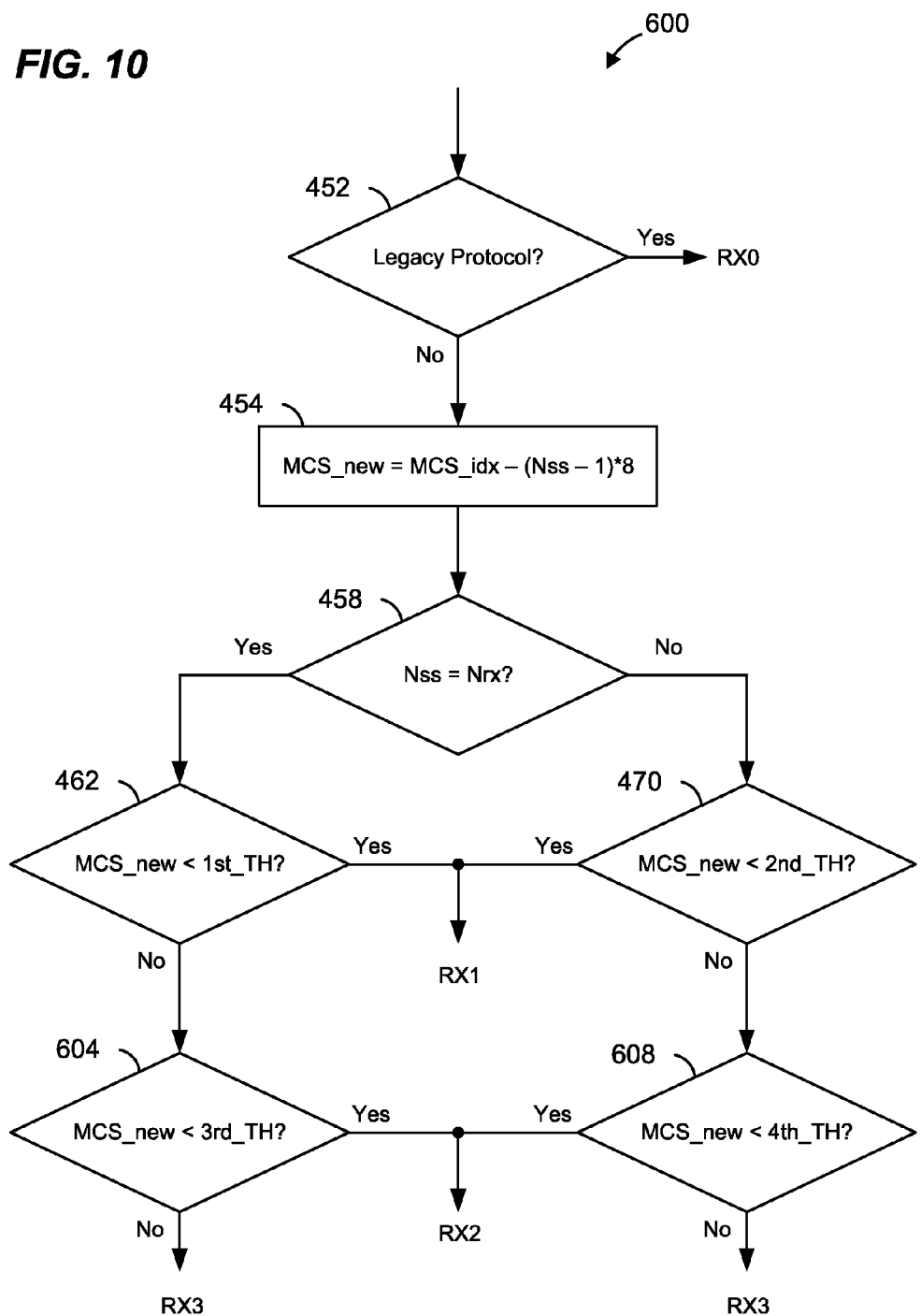
FIG. 10 is a flow diagram of another example method for generating a control signal for controlling a bias current level, according to an embodiment.

FIG. 10 is a flow diagram of another example method 600 for generating the MCS_NSS_MODE control signal (FIG. 5) for a packet being received based on (i) the MCS utilized when transmitting the packet, (ii) the number (Nss) of spatial streams utilized when transmitting the packet, and (iii) the number (Nrx) of receive antennas utilized to receive the packet, according to an embodiment. In an embodiment, the method 600 is implemented by the bias current control device 140 of FIG. 2. In another embodiment, the method 600 is implemented by the baseband DSP. In other embodiments, the method 600 is implemented by some other suitable unit of a network interface.

The method 600 is similar to the method 450 of FIG. 6, and like numbered blocks are not discussed in detail.

At block 462, if it is determined at that MCS_new is not less than 1st_TH, then the flow proceeds to block 604. On the other hand, if it is determined at block 462 that MCS_new is less than 1st_TH, the flow proceeds to block 484. At block 484, it is determined whether an RSSI measurement, corresponding to reception of the packet, meets an RSSI threshold (RSSI_TH). If the RSSI measurement does not meet RSSI_TH (e.g. RSSI<RSSI_TH), this indicates that the signal level and/or quality is relatively low, and thus the MCS_NSS_MODE control signal is set to a value that indicates the RX1 bias current level is to be utilized. On the other hand, if the RSSI measurement meets RSSI_TH (e.g. RSSI>=RSSI_TH), this indicates that the signal level and/or quality is relatively high, and thus the MCS_NSS_MODE control signal can remain set to a value that indicates the RX0 bias current level is to be utilized.

Similarly, at block 470, if it is determined at that MCS_new is not less than 2nd_TH, then the flow proceeds to block 608. On the other hand, if it is determined at block 470 that MCS_new is less than 2nd_TH, the flow proceeds to block 484.

At block 604, it is determined whether MCS_new is less than a third threshold (3rd_TH). For example, in an embodiment, when MCS_new is greater than or equal to 3rd_TH, this indicates an MCS in a very high throughput protocol (e.g., the IEEE 802.11ac Standard) is being utilized and the bias current level must be set high to accommodate a complex MCS.

If it is determined at block 604 that MCS_new is less than 3rd_TH, the MCS_NSS_MODE control signal is set to a value that indicates the RX2 bias current level is to be utilized. On the other hand, if it is determined at block 604 that MCS_new is not less than 3rd_TH, the MCS_NSS_MODE control signal is set to a value that indicates the RX3 bias current level is to be utilized.

Similarly, if it is determined at block 470 that MCS_new is not less than 2nd_TH, the flow proceeds to block 608. At block 608, it is determined whether MCS_new is less than a fourth threshold (4th_TH). For example, in an embodiment, when MCS_new is greater than or equal to 4th_TH, this indicates an MCS in the very high throughput protocol (e.g., the IEEE 802.11ac Standard) is being utilized and the bias current level must be set high to accommodate a complex MCS.

If it is determined at block 608 that MCS_new is less than 4th_TH, the MCS_NSS_MODE control signal is set to a value that indicates the RX2 bias current level is to be utilized. On the other hand, if it is determined at block 608 that MCS_new is not less than 4th_TH, the MCS_NSS_MODE control signal is set to a value that indicates the RX3 bias current level is to be utilized.

In one embodiment, 1st_TH is equal to 4, 2nd_TH is equal to 4, 3rd_TH is equal to 8, and 4th_TH is equal to 8. In other embodiments, other suitable threshold values are utilized. In some embodiments, 1st_TH, 2nd_TH, 3rd_TH, and 4th_TH are configurable parameters that can be adjusted during manufacturing, in the field, etc.

Figure 11:
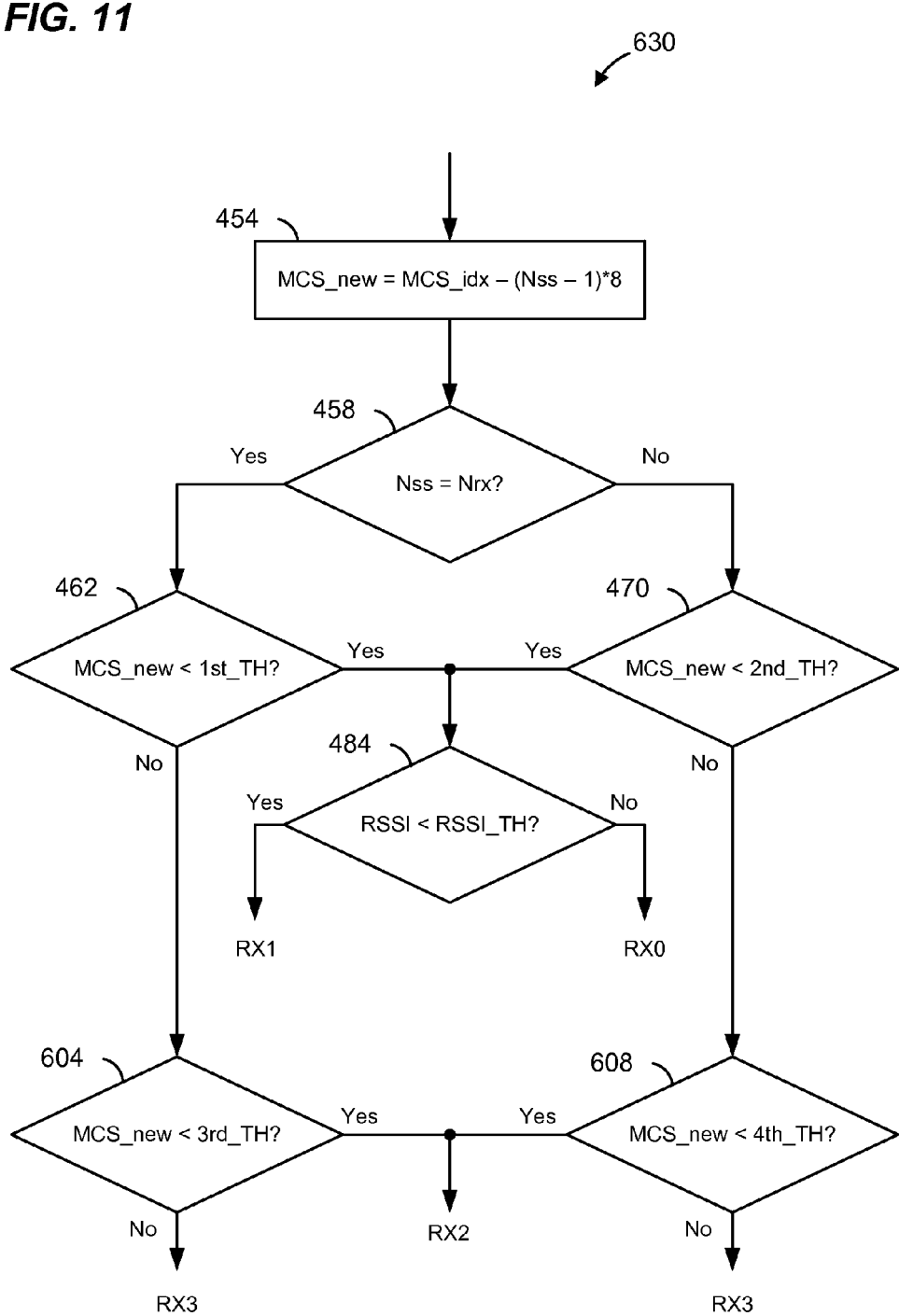
FIG. 11 is a flow diagram of another example method for generating a control signal for controlling a bias current level, according to an embodiment.

FIG. 11 is a flow diagram of another example method 630 for generating bias current level control signal for a packet being received based on (i) the MCS utilized when transmitting the packet, (ii) the number (Nss) of spatial streams utilized when transmitting the packet, and (iii) the number (Nrx) of receive antennas utilized to receive the packet, according to an embodiment. In an embodiment, the method 630 is implemented by the bias current control device 140 of FIG. 2. In another embodiment, the method 630 is implemented by the baseband DSP. In other embodiments, the method 630 is implemented by some other suitable unit of a network interface.

The method 630 is similar to the method 600 of FIG. 10 and the method 480 of FIG. 7, and like numbered blocks are not discussed in detail. In the method 630, it is assumed that the packet being received was transmitted according to a high throughput (HT) protocol (e.g., the IEEE 802.11n Standard) as opposed to a legacy protocol. Thus, the method begins at block 454.

At block 462, if it is determined at that MCS_new is not less than 1st_TH, then the bias current level control signal is set to RX2. On the other hand, if it is determined at block 462 that MCS_new is less than 1st_TH, the flow proceeds to block 484. At block 484, it is determined whether an RSSI measurement, corresponding to reception of the packet, meets an RSSI threshold (RSSI_TH). If the RSSI measurement does not meet RSSI_TH (e.g. RSSI<RSSI_TH), this indicates that the signal level and/or quality is relatively low, and thus the bias current level control signal is set to a value that indicates the RX1 bias current level is to be utilized. On the other hand, if the RSSI measurement meets RSSI_TH (e.g. RSSI>=RSSI_TH), this indicates that the signal level and/or quality is relatively high, and thus the bias current level control signal can remain set to a value that indicates the RX0 bias current level is to be utilized.

If it is determined at block 604 that MCS_new is less than 3rd_TH, the bias current level control signal is set to a value that indicates the RX2 bias current level is to be utilized. On the other hand, if it is determined at block 604 that MCS_new is not less than 3rd_TH, the bias current level control signal is set to a value that indicates the RX3 bias current level is to be utilized.

If it is determined at block 608 that MCS_new is less than 4th_TH, the bias current level control signal is set to a value that indicates the RX2 bias current level is to be utilized. On the other hand, if it is determined at block 608 that MCS_new is not less than 4th_TH, the bias current level control signal is set to a value that indicates the RX3 bias current level is to be utilized.

Figure 12:
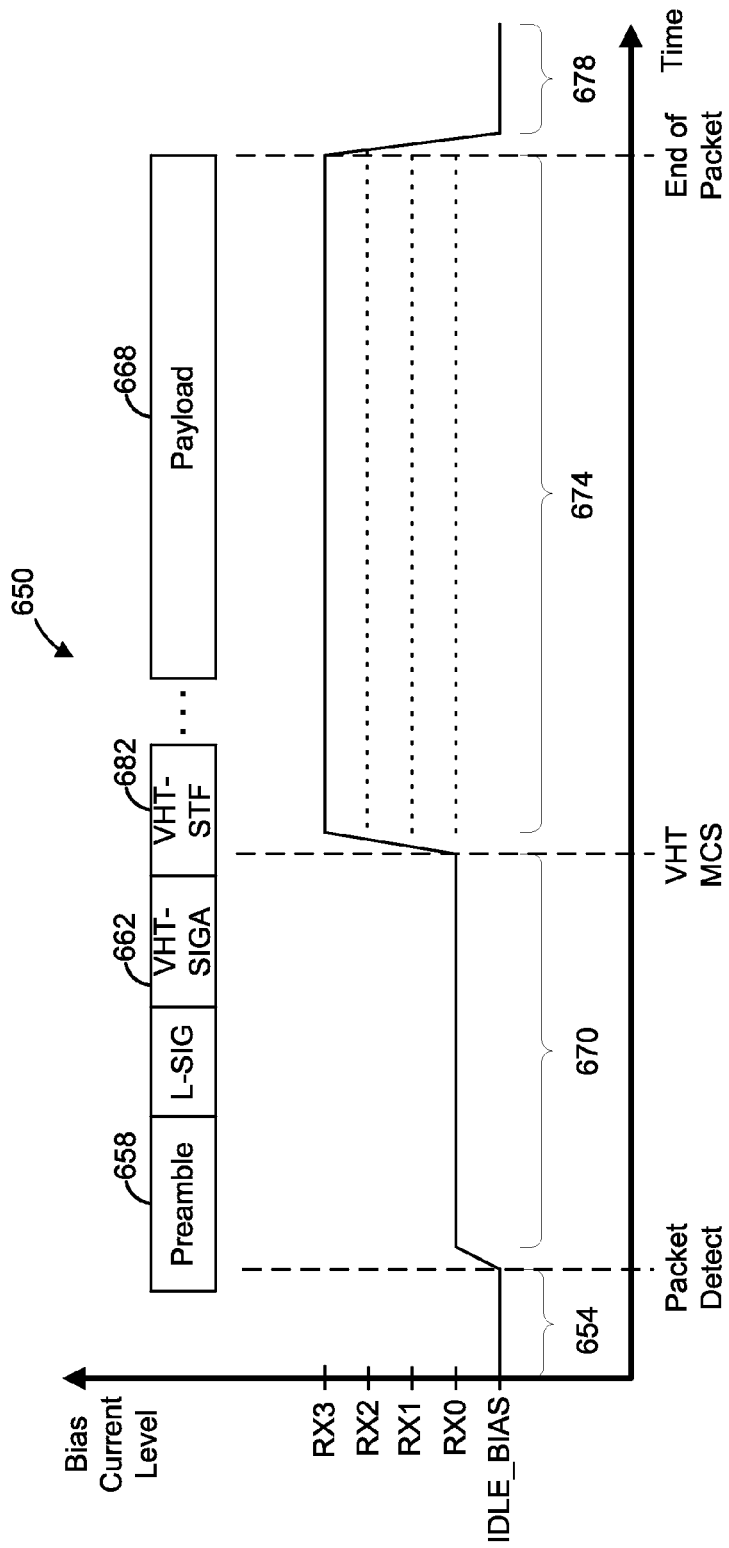
FIG. 12 is a diagram illustrating another example scenario in which a bias current of a unit of the RF receiver device of FIG. 2 is controlled when a packet is being received, according to an embodiment.

FIG. 12 is a diagram illustrating operation of the logic device 400 and the method 600, or the method 630, in an example scenario in which a packet 650 is received, where the packet 650 conforms to a very high throughput protocol (e.g., the IEEE 802.11ac Standard), according to an embodiment.

During a time period 654 that generally corresponds to a time prior to the packet 650 being detected by the network interface (e.g., including a time period between an end of a previous packet (not shown) and the beginning of the packet 650), the logic device 400 selects IDLE_BIAS as the bias current control output.

After receiving at least a portion of a preamble 658 of the packet 650, the network interface (e.g., the DSP or another suitable device in the network interface) detects the packet 650 using a suitable packet detection technique (e.g., including clear channel assessment (CCA) techniques, energy detection techniques, preamble detection techniques, etc.). After the packet 650 is detected by the network interface, the logic device 400 selects RX0 as the bias current control output.

After receiving at least a portion of a very high throughput signal (VHT-SIGA) field 662 of the packet 650, the network interface (e.g., the DSP or another suitable device in the network interface) determines the MCS and the number of spatial streams to be utilized when transmitting a payload 668 of the packet 650. For example, the VHT-SIG field 662 includes a first field that indicates the MCS (e.g., an MCS index) and a second field that indicates Nss. In an embodiment, the RX0 bias current level is adequate for the network interface to provide a required suitable performance level for decoding the VHT-SIGA field 662.

In some embodiments, the RSSI is also measured and compared to a threshold (e.g., RSSI_TH). After the MCS and Nss are determined, the bias current control output is set to RX1, RX2, or RX3 depending on the MCS and Nss, such as according to the method 600 or another suitable method, in an embodiment. In another embodiment, after the MCS and Nss are determined, and after the RSSI is compared to RSSI_TH, the bias current control output is set to RX0, RX1, RX2, or RX3 depending on the MCS, Nss, and RSSI, such as according to the method 630 or another suitable method, in an embodiment.

Thus, during a time period 670 that generally corresponds to a time after the packet 650 is detected by the network interface and the end of the VHT-SIGA field 662, the logic device 400 selects the bias current control output as RX0. On the other hand, during a time period 674 that generally corresponds to a time after the MCS and Nss is determined by the network interface and until the end of the packet 650, the logic device 400 selects the bias current control output as RX0, RX1, RX2, or RX3.

After receiving the end of the packet 650, the logic device 400 selects IDLE_BIAS as the bias current control output. Thus, during a time period 678 that generally corresponds to a time after the packet 650 ends and prior to the network interface detecting a subsequent packet, the logic device 400 selects the bias current control output as IDLE_BIAS.

As can be seen in FIG. 12, the bias current changes during the preamble 658. More specifically, the bias current changes during the L-STF of the preamble 658. The change in the bias current will often cause transients to occur in unit of the RF receiver device 100 for which the bias current is changing. Because the bias current change occurs while the L-STF is being received, however, the RF receiver device 100 is able to suitably adjust and settle after the transients. Similarly, the bias current also changes during a very high throughput short training field (VHT-STF) 682. The change in the bias current will often cause transients to occur in unit of the RF receiver device 100 for which the bias current is changing. Because the bias current change occurs while the VHT-STF field 682 is being received, however, the RF receiver device 100 is able to suitably adjust and settle after the transients.

Figure 13:
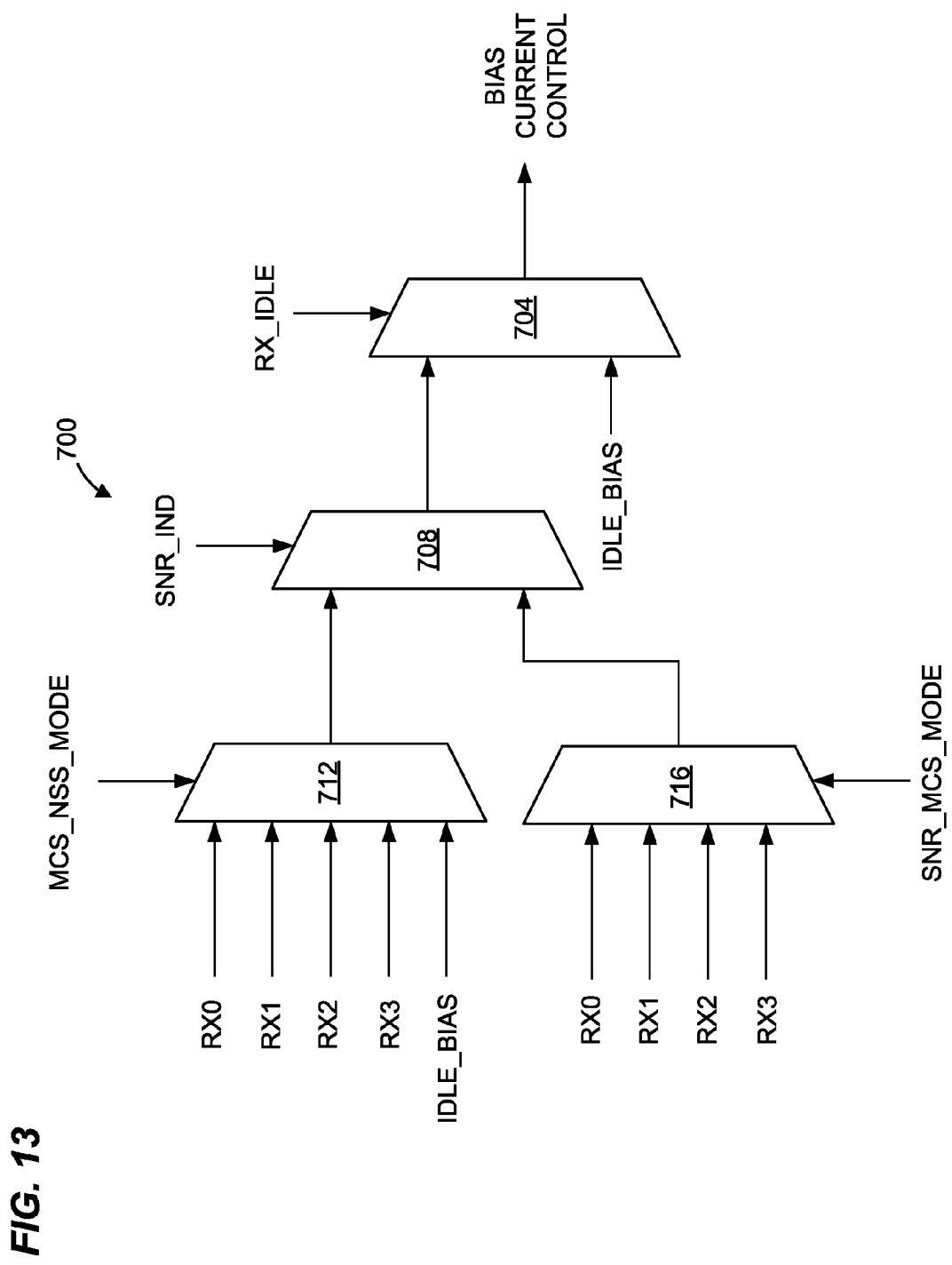
FIG. 13 is a block diagram of another example logic device for generating a control signal for controlling a bias current level, according to an embodiment.

FIG. 13 is a block diagram of example logic device 700 for generating a control signal for controlling a bias current level, according to an embodiment. In an embodiment, the logic device 700 is included in the bias current control device 140 of FIG. 2. In other embodiments, the bias current control device 140 includes another suitable logic device different than the logic device 700.

The logic device 700 includes a multiplexer 704, a multiplexer 708, a multiplexer 712, and a multiplexer 716. The multiplexer 704 includes a first data input, a second data input, a control input, and an output. The output of the multiplexer 704 is a bias current control signal that indicates which bias current level in a set of different bias current levels a unit in the RF receiver device 100 (e.g., the LNA 104, the mixer 108, the TIA 112, the variable gain stage 116, the LPF 120, the variable gain stage 124, etc.) should utilize, in an embodiment.

The first data input of the multiplexer 704 receives an output of the multiplexer 708. The second data input of the multiplexer 704 receives an IDLE_BIAS control value discussed above. The control input of the multiplexer 704 receives the RX_IDLE control signal discussed above.

The multiplexer 708 includes a first data input, a second data input, a control input, and an output. The output of the multiplexer 708 is coupled to the first data input of the multiplexer 704, as discussed above. The first data input of the multiplexer 708 receives an output of the multiplexer 712. The second data input of the multiplexer 408 receives an output of the multiplexer 716.

The control input of the multiplexer 708 receives an SNR_IND control signal for selecting one of (i) the first data input of the multiplexer 708 or (ii) the second data input of the multiplexer 708 as the output of the multiplexer 708. The SNR_IND control signal indicates whether a signal-to-noise ratio (SNR) or other suitable measure of signal quality and/or strength (e.g., received signal strength indicator (RSSI)), corresponding to a packet being received, is at a certain level (e.g., meets a threshold). For example, the SNR_IND control signal indicates whether the SNR, corresponding to a packet being received, meets a threshold, in an embodiment. For example, when the SNR does not meet the threshold, the first data input (i.e., the output of the multiplexer 712) is selected as the output of the multiplexer 708; whereas when the SNR meets the threshold, the second data input (i.e., the output of the multiplexer 716) is selected as the output of the multiplexer 708, in an embodiment.

The multiplexer 712 includes a first data input, a second data input, a third data input, a fourth data input, a fifth data input, a control input, and an output. The output of the multiplexer 712 is coupled to the first data input of the multiplexer 708, as discussed above.

The first data input of the multiplexer 712 receives the RX0 control value discussed above. The second data input of the multiplexer 712 receives the RX1 control value discussed above. The third data input of the multiplexer 712 receives the RX2 control value discussed above. The fourth data input of the multiplexer 712 receives the RX3 control value discussed above. The fifth data input of the multiplexer 712 receives the IDLE_BIAS control signal discussed above.

The control input of the multiplexer 712 receives an MCS_NSS_MODE control signal. In an embodiment, the MCS_NSS_MODE control signal is for selecting one of (i) the first data input of the multiplexer 712, (ii) the second data input of the multiplexer 412, (iii) the third data input of the multiplexer 712, (iv) the fourth data input of the multiplexer 412, or (v) the fifth data input of the multiplexer 712, as the output of the multiplexer 712. The MCS_NSS_MODE generally indicates, when an MCS and a number of spatial streams corresponding to a packet being received has been determined, to which of multiple sets of MCSs the MCS corresponds and the number of spatial streams being utilized at least relative to the number of receive antennas being utilized, in an embodiment. In some embodiments, the MCS_NSS_MODE generally indicates that a packet is detected but that the MCS and number of spatial streams are not yet determined (e.g., select RX0). In some embodiments, the MCS_NSS_MODE generally indicates that a packet is not currently being received or that a packet can be ignored (e.g., select IDLE_BIAS). In an embodiment, the MCS_NSS_MODE control signal is generated using the method 600 of FIG. 10.

The multiplexer 716 includes a first data input, a second data input, a third data input, a fourth data input, a control input, and an output. The output of the multiplexer 716 is coupled to the first data input of the multiplexer 708, as discussed above.

The first data input of the multiplexer 712 receives the RX0 control value discussed above. The second data input of the multiplexer 712 receives the RX1 control value discussed above. The third data input of the multiplexer 712 receives the RX2 control value discussed above. The fourth data input of the multiplexer 712 receives the RX3 control value discussed above.

The control input of the multiplexer 716 receives an SNR_MCS_MODE control signal. In an embodiment, the SNR_MCS_MODE control signal is for selecting one of (i) the first data input of the multiplexer 716, (ii) the second data input of the multiplexer 716, (iii) the third data input of the multiplexer 716, or (iv) the fourth data input of the multiplexer 412, as the output of the multiplexer 716. The SNR_MCS_MODE is generated based on (i) the MCS, (ii) the number of spatial streams, and (iii) and the SNR or RSSI corresponding to the packet being received, in an embodiment. In an embodiment, the MCS_NSS_MODE control signal is generated using the method 630 of FIG. 11.

In other embodiments, the digital logic implemented by the logic device 700 is implemented in a different manner, such as without multiplexers. In an embodiment, the digital logic implemented by the logic device 700 is implemented by a processor executing firmware instructions stored in a memory device.

As discussed above, changing the level of the bias current may cause transients to occur in the unit of the RF receiver device 100 utilizing the bias current. Referring again to FIG. 2, such transients may cause peak detect unit(s) 132 to generate spurious peak detect signal(s). Thus, in an embodiment, the bias current control system 140 is configured to generate one or more control signals (not shown) to disable the peak detect unit(s) 132 during a time period corresponding to a change in a bias current level. For example, in an embodiment, a control signal (not shown) holds the peak detect unit 132 in a disabled state (e.g., a reset state), or otherwise disables generation of the peak detect signal, for a suitable amount of time after a change in a bias current level is initiated. In various embodiments, the amount of time in which generation of the peak detect signal is disabled is 100 ns, 200 ns, 300 ns, 400 ns, etc., or some other suitable amount of time. In an embodiment, the amount of time in which generation of the peak detect signal is disabled is configurable, e.g., in a manufacturing facility, in the field, etc. In an embodiment, whether generation of the peak detect signal can be disabled is configurable. For example, the bias current control system 140 is configurable to enable or disable generation of the control signal for disabling generation of the peak detect signal.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable memory such as a magnetic disk, an optical disk, a RAM, a ROM, a flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device, etc.

While various embodiments have been described with reference to specific examples, which are intended to be illustrative only and not to be limiting, changes, additions and/or deletions may be made to the disclosed embodiments without departing from the scope of the claims.

What is claimed is:

1. A method for controlling a bias current utilized in a unit of a radio frequency (RF) receiver device of a network interface, the method comprising:
   determining, with the network interface, whether a packet being received by the network interface was transmitted using a legacy protocol;
   if the received packet is determined to have been transmitted using a legacy protocol, maintaining the bias current at a first current level;

and
if the received packet is determined to have been transmitted using a non-legacy protocol, generating, with the network interface, a control signal to change the level of the bias current to a second current level.

2. The method of claim 1, further comprising determining, with the network interface, a signal quality indicator for the packet being received by the network interface;
determining whether the level of the bias current should be changed based at least in part on the signal quality indicator.

3. The method of claim 2, wherein the signal quality indicator includes a received signal strength indicator (RSSI).

4. The method of claim 2, wherein the signal quality indicator includes a signal-to-noise ratio (SNR) indicator.

5. The method of claim 1, further comprising selecting, with the network interface and based on the determined modulation scheme, the second current level from a set of multiple different current levels; and
wherein the control signal indicates the selected second current level.

6. The method of claim 5, further comprising determining, with the network interface, a signal quality indicator for the packet being received by the network interface;
wherein selecting the second current level from the set of multiple different current levels is further based on the signal quality indicator.

7. The method of claim 5, wherein the first current level is selected from the set of current levels and corresponds to reception of a packet modulated using 256-QAM modulation.

8. The method of claim 7, wherein:
the second current level in the set of current levels corresponds to reception of a packet modulated using 64-QAM modulation; and
the first current level is higher than the second current level.

9. The method of claim 1, further comprising:
detecting, with the network interface, the packet; and
generating, responsive to detecting the packet, the control signal to increase the level of the bias current.

10. The method of claim 1, further comprising:
determining, with the network interface, an end of the packet; and
generating, with the network interface, the control signal to decrease the level of the bias current after the end of the packet has been received.

11. The method of claim 1, wherein the control signal is generated to change the level of the bias current while a training field in the packet is being received.

12. The method of claim 1, further comprising disabling generation of a peak detection signal by the network interface while the level of the bias current is changing in response to the control signal.

13. An apparatus for receiving a packet via a wireless communication channel, the apparatus comprising:
a network interface including a radio frequency (RF) receiver device;
wherein the RF receiver device includes (i) a signal processing unit that utilizes a bias current, and (ii) a bias current control device configured to control a level of the bias current;
wherein the network interface is configured to
determine whether a packet being received by the network interface was transmitted using a legacy protocol, and
if the received packet is determined to have been transmitted using a legacy protocol, maintain the bias current at a first current level;
if the received packet is determined to have been transmitted using a non-legacy protocol, generate a control signal to change the level of the bias current to a second current level.

14. The apparatus of claim 13, wherein the network interface is configured to
determine a signal quality indicator for the packet being received by the network interface, and
determine whether the level of the bias current should be changed based at least in part on the signal quality indicator.

15. The apparatus of claim 13, wherein the network interface is configured to select, based on a determination that the received packet was transmitted using a non-legacy protocol, the second current level from a set of multiple different current levels; and
wherein the control signal generated by the bias current control device indicates the selected second current level.

16. The apparatus of claim 15, wherein the network interface is configured to
determine a signal quality indicator for the packet being received by the network interface, and
select the second current level from the set of multiple different current levels further based on the signal quality indicator.

17. The apparatus of claim 13, wherein:
the network interface is configured to detect the packet; and
the bias current control device is configured to generate, responsive to detecting the packet, the control signal to increase the level of the bias current.

18. The apparatus of claim 13, wherein:
the network interface is configured to determine an end of the packet; and
the bias current control device is configured to generate the control signal to decrease the level of the bias current after the end of the packet has been received.

19. The apparatus of claim 13, wherein the control signal is generated to change the level of the bias current while a training field in the packet is being received.

20. The apparatus of claim 13, wherein the signal processing unit that utilizes the bias current includes a variable gain amplifier.

21. The apparatus of claim 13, wherein the signal processing unit that utilizes the bias current includes a mixer.

22. The apparatus of claim 13, wherein the signal processing unit that utilizes the bias current includes a filter.

23. The apparatus of claim 13, wherein:
the RF receiver device includes a peak detection circuit configured to detect a peak in a signal being processed by the RF receiver device and to generate a peak detect signal;
the bias current control device is configured to disable generation of the peak detection signal while the level of the bias current is changing in response to the control signal.

24. A method for controlling a bias current utilized in a unit of a radio frequency (RF) receiver device of a network interface, the method comprising:
determining, with the network interface, a modulation scheme utilized in a packet being received by the network interface;
determining a number of spatial streams being utilized in the packet;

determining, with the network interface and based on the determined modulation scheme and on the determined number of spatial streams, whether a level of the bias current should be changed; and when it is determined that the level of the bias current should be changed, generating, with the network interface, a control signal to change the level of the bias current.

* * * * *